United States Patent
Suzue et al.

(10) Patent No.: US 10,189,138 B2
(45) Date of Patent: Jan. 29, 2019

(54) SPECTACLE LENS MANUFACTURING SYSTEM, MANUFACTURING DEVICE, MANUFACTURING METHOD, MANUFACTURING INFORMATION MANAGEMENT SYSTEM, MANUFACTURING INFORMATION MANAGEMENT DEVICE, AND MANUFACTURING INFORMATION MANAGEMENT METHOD

(71) Applicant: HOYA CORPORATION, Tokyo (JP)

(72) Inventors: Takahiro Suzue, Tokyo (JP); Hiroshi Yoshizaki, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 458 days.

(21) Appl. No.: 14/770,175

(22) PCT Filed: Feb. 14, 2014

(86) PCT No.: PCT/JP2014/053417
§ 371 (c)(1),
(2) Date: Aug. 25, 2015

(87) PCT Pub. No.: WO2014/132812
PCT Pub. Date: Sep. 4, 2014

(65) Prior Publication Data
US 2016/0008943 A1 Jan. 14, 2016

(30) Foreign Application Priority Data

Feb. 26, 2013 (JP) ................................. 2013-036124

(51) Int. Cl.
*B24B 9/14* (2006.01)
*G02C 7/02* (2006.01)
(Continued)

(52) U.S. Cl.
CPC ................ *B24B 9/14* (2013.01); *B24B 9/148* (2013.01); *G02C 7/02* (2013.01); *G02C 7/024* (2013.01);
(Continued)

(58) Field of Classification Search
CPC .. B24B 9/14; B24B 9/148; G02C 7/02; G02C 7/024; G02C 13/003; G05B 19/418;
(Continued)

(56) References Cited

U.S. PATENT DOCUMENTS

| | | | |
|---|---|---|---|
| 5,887,326 A | 3/1999 | Bower et al. | |
| 2005/0073650 A1* | 4/2005 | Ito | G02C 7/021 351/200 |

(Continued)

FOREIGN PATENT DOCUMENTS

| | | |
|---|---|---|
| EP | 1475187 A2 | 11/2004 |
| EP | 1967894 A1 | 9/2008 |

(Continued)

OTHER PUBLICATIONS

Apr. 15, 2014 Search Report issued in International Patent Application No. PCT/JP2014/053417.

(Continued)

*Primary Examiner* — Eileen Morgan
(74) *Attorney, Agent, or Firm* — Oliff PLC

(57) ABSTRACT

A spectacle lens manufacturing system, wherein a relationship between a type of a spectacle frame and a framing content is converted to a matrix, includes: an information memory part to store the matrix including a size correction value for a scheduled edging shape of a lens as a numerical value in the matrix; an edging information acquisition part to acquire edging information calculated based on client side information for manufacturing a spectacle lens, including spectacle lens, prescription value, frame, and tracer infor- (Continued)

mation, and spectacle lens manufacturing side information, and the size correction value selected from the matrix corresponding to the framing content and the frame type as numerical values in the matrix; an edger to edge a lens based on the edging information acquired by the edging information acquisition part. Even if either one of the client and manufacturing sides performs the framing step, the spectacle lens can be manufactured.

15 Claims, 12 Drawing Sheets

(51) Int. Cl.
  *G05B 19/418* (2006.01)
  *G02C 13/00* (2006.01)
(52) U.S. Cl.
  CPC .......... *G02C 13/003* (2013.01); *G05B 19/418* (2013.01); *G05B 2219/32022* (2013.01); *G05B 2219/37375* (2013.01); *G05B 2219/45157* (2013.01); *G05B 2219/45175* (2013.01); *Y02P 90/02* (2015.11); *Y02P 90/20* (2015.11)
(58) Field of Classification Search
  CPC ........... G05B 2219/32022; G05B 2219/37375; G05B 2219/45157; G05B 2219/45175
  USPC ..................... 451/43, 44, 255, 256
  See application file for complete search history.

(56) References Cited

U.S. PATENT DOCUMENTS

| | | | |
|---|---|---|---|
| 2007/0190899 A1 | 8/2007 | Takeichi et al. | |
| 2008/0051012 A1 | 2/2008 | Akiyama et al. | |
| 2009/0222122 A1 | 9/2009 | Daimaru et al. | |
| 2009/0276238 A1 | 11/2009 | Filipovich et al. | |
| 2013/0260642 A1* | 10/2013 | Kikuchi | B24B 9/144 451/5 |
| 2014/0302749 A1* | 10/2014 | Samukawa | B24B 9/148 451/5 |
| 2015/0049304 A1* | 2/2015 | Cussac | G02C 7/028 351/159.75 |
| 2016/0161761 A1* | 6/2016 | Quere | B29C 64/124 427/164 |

FOREIGN PATENT DOCUMENTS

| | | |
|---|---|---|
| JP | H04-13539 A | 1/1992 |
| JP | H10-58294 A | 3/1998 |
| JP | 2007-203424 A | 8/2007 |
| WO | 2007/077848 A1 | 7/2007 |

OTHER PUBLICATIONS

Mar. 10, 2017 Search Report issued in European Patent Application No. 14757685.4.

* cited by examiner

FIG.2

| SPECTACLE SHOP TYPE | TRACER TYPE | FRAME TYPE | | | | | | |
|---|---|---|---|---|---|---|---|---|
| | | FULL RIM | | | RIMLESS | | HALF RIM | |
| | | 01 | 02 | 03 | 04 | 05 | 06 | 07 |
| 01 | T1 | | | | | | | |
| 01 | T2 | | | | | | | |
| 02 | T1 | | | | | | | |
| 02 | T2 | | | | | | | |
| 03 | T1 | | 5 | | | | | |
| 03 | T2 | | 10 | | | | | |
| 04 | T1 | | | | | | | |
| 04 | T2 | | | | | | | |

*UNIT OF THE NUMERICAL VALUE IS (1/100) mm

FIG.3

| SPECTACLE SHOP TYPE | FRAMING SIDE | NECESSITY/NON-NECESSITY OF HEATING | FRAME TYPE ||||||| 
| | | | FULL RIM || | RIMLESS || HALF RIM ||
| | | | 01 | 02 | 03 | 04 | 05 | 06 | 07 |
| 01 | MANUFACTURING PARTY | PRESENCE | | | | | | | |
| 02 | SPECTACLE SHOP | ABSENCE | | | | | | | |
| 03 | SPECTACLE SHOP | PRESENCE | | 10 | | | | | |
| 04 | SPECTACLE SHOP | ABSENCE | | | | | | | |

*UNIT OF THE NUMERICAL VALUE IS (1/100) mm

SPECTACLE LENS MANUFACTURING SYSTEM, MANUFACTURING DEVICE, MANUFACTURING METHOD, MANUFACTURING INFORMATION MANAGEMENT SYSTEM, MANUFACTURING INFORMATION MANAGEMENT DEVICE, AND MANUFACTURING INFORMATION MANAGEMENT METHOD

TECHNICAL FIELD

The present invention relates to a spectacle lens manufacturing system, a spectacle lens manufacturing device, a spectacle lens manufacturing method, a spectacle lens manufacturing information management system, a spectacle lens manufacturing information management device, and a spectacle lens manufacturing information management method.

DESCRIPTION OF RELATED ART

Usually, a client who is planning a purchase of spectacles visits to a spectacle shop, and orders a desired spectacle in the spectacle shop. Then, the spectacle shop reports an order content to a spectacle lens manufacturing party (simply called a "manufacturing party" hereafter), and orders the spectacle lens to the manufacturing party. Then, the manufacturing party manufactures the spectacle lens based on the order content, and delivers the spectacle lens to the spectacle shop. Then, the spectacle lens is framed into a spectacle frame (frame) to complete the spectacle at the spectacle shop. Finally, there is a mechanism of receiving the spectacle by the client at the spectacle shop. In the above case, although framing process is performed at the spectacle shop, the framing process is performed at the manufacturing party in some cases.

The client selects a desired frame at the spectacle shop. Then, the spectacle shop operates a frame shape measurement device (simply called a "tracer" hereafter) provided in the spectacle shop, to measure the frame shape. The result is transmitted to the manufacturing party together with a prescription value of the client and the order content. Then, based on the information regarding the order content, the spectacle lens is edged so as to be fitted into the frame. This edging is called an "edging for framing" hereafter. Also, fitting the spectacle lens into the frame is called a "framing".

In order to perform such an edging for framing, a sophisticated technique is required. In addition, due to high difficulty of the edging for framing, the framing cannot be satisfactorily performed after all, and such a case often occurs. Therefore, various techniques have been developed, for the purpose of precisely performing edging for framing, and surely framing a spectacle lens into a spectacle frame, by the manufacturers themselves.

For example, as described in patent document 1, there is known a technique of manufacturing a spectacle lens by the manufacturing party, based on measurement data corrected in consideration of the information regarding a tracer provided at a client side. More specifically, a difference of a size mainly due to the characteristic of a frame material (flexibility of the frame), is corrected from the information regarding the frame type out of the order content transmitted from the client side. Then, the relevant correction value is adapted to an edging size of the spectacle lens, to thereby manufacture the spectacle lens. Finally, the spectacle lens is delivered to the spectacle shop, and the spectacle lens is supplied to the client via the spectacle shop.

Further, as described in patent document 2, there is also known a technique of obtaining edging data from an amount of measurement error specific to the tracer, and an amount of measurement error specific to an edger provided separately from the tracer.

PRIOR ART DOCUMENT

Patent Document

Patent document 1: WO2007/077848
Patent document 2: Japanese Patent Laid Open Publication No. 1992-13539

In the technique described in patent document 1, measurement data is corrected, according to the information regarding the tracer, and the frame type. Simultaneously, edging data is also corrected separately for the edger, based on the information regarding the edger.

Although the technique of patent document 1 is extremely useful, the framing cannot be surely performed only by the technique of patent document 1, because a business condition of manufacturing the spectacle lens, is remarkably changed. Even in the case of using the amount of error according to the tracer and the edger respectively using the technique of patent document 2, the edging for framing cannot be precisely performed because the business condition of manufacturing a spectacle lens is remarkably changed, and the framing cannot be surely performed after all. Explanation will be given hereafter, with specific examples.

As described above, it is at least one of the spectacle shop (simply called "client side" hereafter) and the manufacturing party (simply called "manufacturing side" hereafter), that performs framing. By an examination by inventors of the present invention, it is found that framing is performed respectively using infinite variety of unique approach. For example, when the framing is performed and the frame is warmed at the client side, the size of the frame is enlarged as compared with that before the framing process. In this case, even if the spectacle lens is manufactured as designed, a problem possibly arises such that an outer diameter of the spectacle lens is too small in comparison with a frame, when framing is performed at the client side.

A content of the framing process is also called a "content of a framing step", which is a content such that the frame is warmed at the time of framing so that the spectacle lens is easily framed into a frame, and the spectacle lens is fastened tightly into the frame during framing (described later).

As described above, the outer diameter of the spectacle lens can be obtained as requested by a specific one client, by accumulating trial and error or empirical rules at the manufacturing side, if the manufacturing side is a one-to-one relationship with the client side. However, when there a plurality of client sides, the manufacturing side must accumulate the trial and error and the empirical rules, for each client side, thus increasing a load. As if further increasing the load, a certain client side performs framing at the client side using its own unique technique, and meanwhile a certain client side requests the manufacturing side to perform framing in some cases. Then, the manufacturing side's unique framing technique is also required to be taken into consideration in the trial and error or empirical rules. It is also found by the inventors of the present invention, that requests of the clients are steadily diversified, and there is also a request that the spectacle lens is more tightly fastened to the frame than conventional, thus steadily diversifying the framing content.

Of course, a plurality of client sides can be responded by confirming the framing content at every time of the ordering, although this is an extremely complicated process. However, globalization is remarkably progressed in a manufacturing sector at present. Therefore, the client side or the manufacturing side is present in a foreign country in many cases. In this case, it is practically impossible to confirm the framing content at every time of the ordering.

With a development of an information network, it is requested to speedily manufacture products regardless of any change of the situation. Under such a circumstance, if the delicate edging for framing and the framing can be performed only by a specific ordering side and a specific manufacturing side, it is impossible to speedily respond to a variety of customer's needs, resulting in a situation that the manufacturing side has a great loss in an international competitiveness.

Therefore, a main object of the present invention is to globally and speedily provide a spectacle lens that can be framed into a spectacle frame satisfactorily, regardless of the locations of the ordering side and the manufacturing side of the spectacle lens.

The inventors of the present invention examine a technique of solving the above-described problem, and it is found that first, the above-described problem is generated by performing the framing process using its own unique technique of the client side and the manufacturing side. Then, in order to organize such a situation, the inventors of the present invention obtain a knowledge as follows: a matrix is previously prepared by converting the framing content which is a framing process and the frame type, and "action performed during framing" is converted to "numerical value" at each of the client side and the manufacturing side, and this numerical value is positioned as a size correction value, so that the size correction value is reflected on the outer diameter (size) of the spectacle lens to be manufactured. Namely, the framing content performed at an actual location such as the client side and the manufacturing side, is converted to the numerical value, and even if there are a plurality of client sides, or even if any kind of the framing process is performed at the client side and the manufacturing side, a centralized control system is achieved so that the spectacle lens has a suitable outer diameter.

Based on the above-described knowledge, there are aspects of the present invention as follows.

According to a first aspect, there is provided a spectacle lens manufacturing system, wherein a relationship between a type of a spectacle frame and a framing content performed at either one of a plurality of client sides that request a manufacture of a spectacle lens and a manufacturing side of the spectacle lens, is converted to a matrix, the system including:

an information memory part configured to store the matrix including a size correction value for a scheduled edging shape of a lens to be edged as a numerical value in the matrix;

an edging information acquisition part configured to acquire edging information calculated based on client side information for manufacturing a spectacle lens, including spectacle lens information, prescription value information, frame information such as information regarding a frame type, and tracer information such as information regarding a tracer type used for measuring a framed shape, and spectacle lens manufacturing side information such as edger information, and the size correction value selected from the matrix corresponding to the framing content and the frame type, which is the size correction value for a scheduled edging shape of a lens to be edged, as numerical values in the matrix;

an edger configured to edge a lens to be edged based on the edging information acquired by the edging information acquisition part, wherein even if either one of the client side and the manufacturing side performs the framing step, the spectacle lens fitted into the frame can be manufactured.

According to a second aspect, there is provided the system of the first aspect, wherein the framing content is obtained from client side framing information included in the client side information and manufacturing side framing information included in the manufacturing side information, and the framing content includes at least one of necessity/non-necessity for heating a frame and a degree of heating the frame, and a fastening degree of the spectacle lens into the frame during framing.

According to a third aspect, there is provided the system of the second aspect, wherein the size correction value includes a size correction value A and a size correction value B, and the size correction value A is a numerical value in the matrix when at least a relationship between the tracer type and the frame type is converted to matrix A, and the size correction value B is a numerical value in the matrix when at least the framing step is performed at either one of the client side and the manufacturing side, or when a relationship of necessity/non-necessity for heating a frame, a degree of heating the frame, and the frame type, is converted to matrix B.

According to a fourth aspect, there is provided the system of any one of the first to third aspects, wherein the spectacle lens is manufactured by the edger, under a manufacturing side environment, in accordance with a lens deformation amount between a case when the spectacle lens is present in an ordering side environment and when the spectacle lens is present in a manufacturing side environment, calculated based on environment information such as ordering side environment information and manufacturing side environment information of the spectacle lens and lens deformation information regarding a deformation of a lens according to an environment, and edging information calculated based on the size correction value A and the size correction value B, so that the spectacle lens is fitted into the frame even under an ordering side environment wherein the ordering side of a spectacle lens, refers to a client who purchases the spectacle lens, and the client side for manufacturing a spectacle lens refers to the ordering side of a spectacle lens, which is a prime contractor when the prime contractor that receives an order of a spectacle lens requests a subcontractor to manufacture the spectacle lens, or refers to the subcontractor when the subcontractor requests further another subcontractor to manufacture the spectacle lens.

According to a fifth aspect, there is provided the system of any one of the first to fourth aspects, including:

a client side computer installed at a client side;

a manufacturing side computer installed at a manufacturing side; and a calculation part configured to calculate the edging information, wherein the client side computer further comprising:

a client side transmission part for transmitting the client side information to the calculation part, the client side information including information whether or not framing is performed at the client side, and when the framing is performed, information whether or not heating is performed to the frame, and information regarding a heating degree, and the manufacturing side computer further comprising at least:

a manufacturing side transmission part for transmitting to the calculation part the manufacturing side information including manufacturing side framing information such as information whether or not framing is performed at a manufacturing side and when the framing is performed, and information whether or not heating is performed to the frame during the framing, and information regarding a degree of the heating, wherein the edging information is calculated by the calculation part based on the client side information, the manufacturing side information, and the size correction value obtained from the information memory part in accordance with the client side information and the manufacturing side information, and the edging information thus calculated is transmitted to the edging information acquisition part.

According to a sixth aspect, there is provided the system of the first aspect, including:

a client side computer installed at a client side; and a calculation part configured to calculate the edging information, wherein the size correction value includes at least a numerical value in a matrix when a relationship between a fastening degree of a spectacle lens into a frame during framing and a frame type, is converted to the matrix, and the client side computer causes a client side to give an instruction of an edging size of a spectacle lens to a manufacturing side, based on the numerical value corresponding to the frame type and a fastening degree of the spectacle lens into the frame during the framing.

According to a seventh aspect, there is provided a spectacle lens manufacturing device, wherein a relationship between a frame type and a framing content performed at either one of a plurality of client sides that request a manufacture of a spectacle lens, is converted to a matrix, the device comprising:

an edging information acquisition part configured to acquire edging information calculated based on client side information for manufacturing a spectacle lens, including spectacle lens information, prescription value information, frame information such as information regarding a frame type, and tracer information such as information regarding a tracer type used for measuring a framed shape, and spectacle lens manufacturing side information such as edger information, and a size correction value selected from the matrix corresponding to the framing content and the frame type, which is the size correction value for a scheduled edging shape of a lens to be edged, as numerical values in the matrix; and an edger configured to edge a lens to be edged based on the edging information acquired by the edging information acquisition part, wherein even if framing is performed by either one of a request side and a manufacturing side, a spectacle lens fitted into a frame can be manufactured.

According to an eighth aspect, there is provided a spectacle lens manufacturing method for manufacturing a spectacle lens fitted into a frame even if framing is performed at either one of a request side and a manufacturing side, wherein a relationship between a frame type and a framing content performed at either one of a plurality of client sides that request a manufacture of a spectacle lens and a manufacturing side of a spectacle lens, is converted to a matrix, and a lens to be edged is edged in accordance with edging information calculated based on client side information for manufacturing a spectacle lens, including spectacle lens information, prescription value information, frame information such as information regarding a frame type, and tracer information such as information regarding a tracer type used for measuring a framed shape, and spectacle lens manufacturing side information such as edger information, and a size correction value as a numerical value in the matrix for a scheduled edging shape of a lens to be edged.

According to a ninth aspect of the present invention, there is provided a spectacle lens manufacturing information management system for a spectacle lens fitted into a frame even if framing is performed for a spectacle lens at either one of a request side and a manufacturing side, wherein a relationship between a frame type and a framing content performed at either one of a plurality of client sides that request a manufacture of a spectacle lens and a manufacturing side of a spectacle lens, is converted to a matrix, the system comprising:

an information memory part configured to store the matrix including a size correction value for a scheduled edging shape of a lens to be edged as a numerical value in the matrix;

an edging information acquisition part configured to acquire edging information calculated based on client side information for manufacturing a spectacle lens, including spectacle lens information, prescription value information, frame information such as information regarding a frame type, and tracer information such as information regarding a tracer type used for measuring a framed shape, and spectacle lens manufacturing side information such as edger information, and the size correction value selected from the matrix corresponding to the framing content and the frame type, which is the size correction value for a scheduled edging shape of a lens to be edged, as numerical values in the matrix; and an intermediary side transmission part configured to transmit the edging information acquired by the edging information acquisition part, to a manufacturing side, wherein even if either one of the client side and the manufacturing side performs the framing step, the spectacle lens fitted into the frame can be manufactured.

According to a tenth aspect of the present invention, there is provided a spectacle lens manufacturing information management device for a spectacle lens fitted into a frame even if framing is performed at either one of a request side and a manufacturing side, wherein a relationship between a frame type and a framing content performed at either one of a plurality of client sides that request a manufacture of a spectacle lens and a manufacturing side of a spectacle lens, is converted to a matrix, the device including:

an edging information acquisition part configured to acquire edging information calculated based on client side information for manufacturing a spectacle lens, including spectacle lens information, prescription value information, frame information such as information regarding a frame type, and tracer information such as information regarding a tracer type used for measuring a framed shape, and spectacle lens manufacturing side information such as edger information, and the size correction value selected from the matrix corresponding to the framing content and the frame type, which is the size correction value for a scheduled edging shape of a lens to be edged, as numerical values in the matrix.

According to an eleventh aspect of the present invention, there is provided a spectacle lens manufacturing information management method, wherein a relationship between a frame type and a framing content performed at either one of a plurality of client sides that request a manufacture of a spectacle lens and a manufacturing side of a spectacle lens, is converted to a matrix, the method including transmitting to a manufacturing side edging information calculated based on client side information for manufacturing a spectacle lens, including spectacle lens information, prescription value information, frame information such as information regarding a frame type, and tracer information such as information regarding a tracer type used for measuring a framed shape, spectacle lens manufacturing side information such as edger information, and a size correction value for a scheduled edging shape of a lens to be edged, which is a numerical value in the matrix.

Advantage of the Invention

According to the present invention, a spectacle lens can be globally and speedily provided, which can be framed into a spectacle frame satisfactorily even if a framing process is performed at either one of a client side and a manufacturing side, and even if any kind of framing process is performed.

BRIEF DESCRIPTION OF THE DRAWINGS

FIG. 2 shows a specific example of a matrix A according to this embodiment.

FIG. 3 is a specific example of a matrix B according to this embodiment.

DETAILED DESCRIPTION OF THE INVENTION

Embodiment 1

Figure 1:
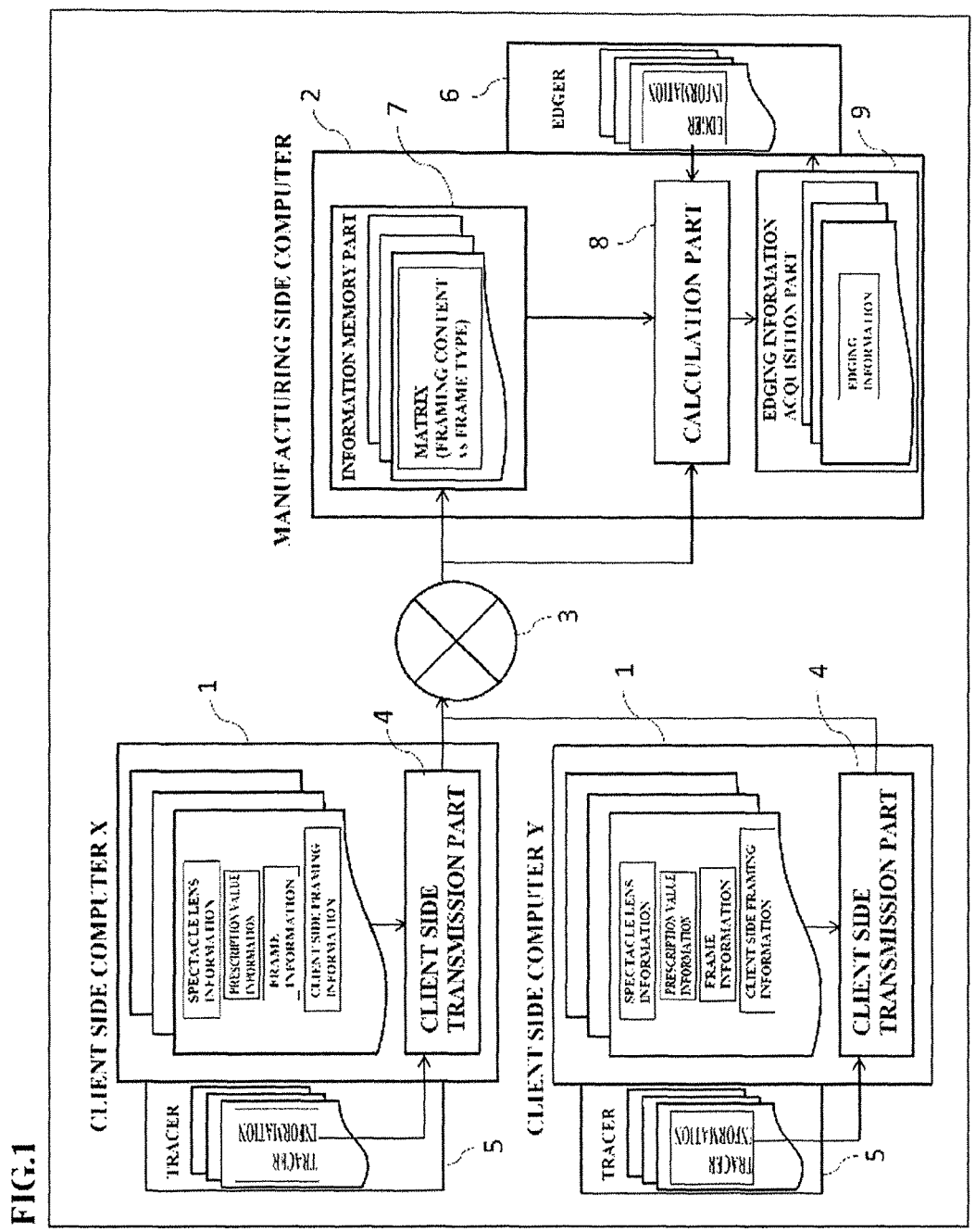
FIG. 1 is a schematic block diagram of a spectacle lens manufacturing system according an embodiment.

An embodiment of the present invention will be described hereafter. This embodiment will be described in the following order.
1. A spectacle lens manufacturing system
   1-A) Client side computer
   1-A-a) Client side transmission part
   (1) Client side information
      (1a) Spectacle lens information
      (1b) Prescription value information
      (1c) Frame information
      (1d) Tracer information
      (1e) Client side framing information
   1-B) Manufacturing side computer
   1-B-a) Edger
   (2) Manufacturing side information
      (2a) Edger information
      (2b) Manufacturing side framing information
   1-B-b) Environment information acquisition part
   (3) Size correction value
      (3a) Size correction value A
      (3b) Size correction value B
   1-B-c) Calculation part
   1-B-d) Edging information acquisition part
   (4) Edging information
   1-C) Others
2. A spectacle lens manufacturing device
3. Program for spectacle lens manufacturing system
4. Manufacturing method of a spectacle lens
5. Effect of an embodiment
6. Modified example This embodiment is set as [Embodiment 1], and shows a simple case that a manufacturing side computer receives a request from a client side computer, and a spectacle lens is manufactured by an edger connected to the manufacturing side computer.

[Embodiment 2] shows a case that there are a plurality of manufacturing sides (at least manufacturing party X and manufacturing party Y), which is the case as follows.

That is, at the manufacturing party X, edging information is calculated in consideration of a manufacturing party X's unique framing content, to thereby perform edging of the spectacle lens in accordance with the edging information. On the other hand, regarding the spectacle lens not manufactured by the manufacturing party X, the manufacturing party X requests a manufacturing party Y to manufacture the spectacle lens. Then, the manufacturing party Y who receives the request, also calculates the edging information in consideration of the a manufacturing party Y's unique framing content.

[Embodiment 3] shows the following case, which is the case that there are a plurality of manufacturing sides (manufacturing party X and manufacturing party Y). Namely, the manufacturing party X calculates the edging information in consideration of the manufacturing party X's unique framing content, and edges the spectacle lens in accordance with the edging information. On the other hand, regarding the spectacle lens not manufactured by the manufacturing party X, the manufacturing party X requests the manufacturing party Y to manufacture the spectacle lens. However, the manufacturing party X calculates the edging information in consideration of the manufacturing party Y's unique framing content. Then, the manufacturing party Y manufactures the spectacle lens in accordance with the size correction value (edging information itself depending on a case) transmitted from the manufacturing party X.

[Embodiment 4] shows not a case of a self-manufacturing of the spectacle lens, but a case of subcontracting the manufacturing party of the spectacle lens to others, which is the case of focusing on the management of the manufacturing information of the spectacle lens.

[Embodiment 5] shows a case that the manufacturing side performs a manufacture of a spectacle lens in consideration of not only a unique framing content for a party who performs framing, but also a difference between a client side environment and a manufacturing side environment, as an improved example that can be added to the contents of [Embodiments 1 to 4].

[Embodiment 6] shows a case that not only conveying to the manufacturing side a client side preference which is a framing content, but also giving a positive instruction to the manufacturing side from the client side is given, regarding an edging size reflecting the preference of the client side, thus giving a detailed instruction regarding an outer diameter shape of the spectacle lens.

This embodiment shows a case of an improved supply system of a spectacle lens provided by the inventor of the present invention, and disclosed by the present applicant in WO2007/077848 Publication, as a spectacle lens manufacturing system (for example, specifically at least one of a client side computer and a manufacturing side computer). This specification describes all contents of WO2007/077848. Then, in this specification, the content of the WO2007/077848 Publication may be suitably applied to a portion if not specified otherwise, while focusing on the description of the present invention.

1. Spectacle Lens Manufacturing System

A functional structure of the spectacle lens manufacturing system according to this embodiment will be described first. FIG. 1 is a schematic block diagram of the spectacle lens manufacturing system according to this embodiment. The spectacle lens manufacturing system according to this embodiment is roughly divided into a client side computer 1 installed at a client side of a spectacle lens, and a manufacturing side computer 2 installed at a manufacturing side of a spectacle lens. Then, the client side computer 1 and the manufacturing side computer 2 are connected with each other via a communication line 3.

1-A) Client Side Computer 1

The client side computer 1 refers to a computer installed at a side for requesting an acquisition of the edging information required for manufacturing a spectacle lens. The "client side of manufacturing a spectacle lens" refers to the ordering side of a spectacle lens, which is a prime contractor when manufacture of the spectacle lens is requested to a subcontractor by the prime contractor who receives an order of the spectacle lens, or refers to the subcontractor when manufacture of the spectacle lens is requested to further another subcontractor by the subcontractor. This embodiment shows a case that "the client side of manufacturing a spectacle lens" is "the ordering side of a spectacle lens" so as to be easy to be understood. "The ordering side of a spectacle lens" also refers to a "spectacle shop" in this embodiment.

In the case of this embodiment, the client side computer 1 is a computer installed at a spectacle shop. A person who is considering a purchase of a spectacle lens (a spectacle wearer and a client) comes to the spectacle shop. Then, information for ordering a spectacle lens is acquired from the client. The information includes spectacle lens information, frame information, prescription value information, and ordering side area information, etc., and any one of these information will be described later.

The client side computer 1 has a function as a computer. A plurality of client side computers 1 may exist in a system.

Further, a controller is present in the client side computer 1, for managing and controlling various information required for manufacturing a spectacle lens, and for managing and controlling each part provided in the client side computer 1. However, a specific structure of the controller may be realized utilizing a publicly-known technique, and detailed explanation therefore is omitted here.

1-A-a) Client Side Transmission Part 4

A client side transmission part 4 is given as a structure provided in the client side computer 1. Information treated by this structure will be descried hereafter, together with the structure.

The client side transmission part 4 of this embodiment has a function of transmitting frame information (1c), tracer information (1d), and client side framing information (1e) to an information memory part 7, to acquire a size correction value required for calculating edging information, and simultaneously, in addition, has a function of transmitting client side information (1) required for calculating the edging information, to a calculation part 8.

Each information will be described hereafter.

Since there are much kinds of information described in this embodiment, each information is indicated by numbers and lower-case alphabetic characters in parentheses. In the case of the same number, each information has a relationship such that "spectacle lens information (1a) and frame information (1b) belong to the client side information (1)" for example.

Description of (1), (2), . . . is omitted, for the convenience of explanation.

(1) Client Side Information

Spectacle lens information, frame information, prescription value information, and ordering side area information, etc., are given as the client side information. The above-mentioned each information will be described hereafter.

(1a) Spectacle Lens Information

The spectacle lens information is the information which makes a pair with the frame information, and which is the information regarding a spectacle lens. Information belonging to the spectacle lens information, includes the type of the spectacle lens (such as monofocal lens, bifocal lens, and progressive power lens, etc.), materials, lens curve, lens color, and presence/absence of a functional film (such as a light control film, a polarizing film, and a hard coat film, etc.), for example.

(1b) Prescription Value Information

The prescription value information is the information regarding a prescription value required for the spectacle lens worn by a client. The information belonging to the prescription value information includes surface power, astigmatic power, astigmatic axis, addition, prism prescription, etc.

(1c) Frame Information

The frame information is the information regarding a shape of a portion fitted into an outer edge of the spectacle lens. For example, a frame type (frame type such as a frame with rim half rim, or rimless, and a material of a frame), frame shape data, frame size, tilt angle, frame color, frame maker, and model name, etc., can be given as the information belonging to the frame information. The frame information can be acquired by using a tracer 5 installed in the spectacle shop. The tracer 5 three-dimensionally measures the frame shape. A measurement result obtained by the tracer 5, is inputted in the client side computer 1 as frame shape data. A publicly-known tracer can be used as the tracer 5.

(1d) Tracer Information

In this embodiment, information regarding the tracer 5 is also required. For example, a maker and a model (tracer type) of the tracer 5, or the like can be given. A different frame shape is sometimes calculated, depending on a used tracer, and the tracer information is also included in the client side information in this embodiment, so that satisfactory framing can be performed.

Incidentally, it is also conceivable that the manufacturing side has the tracer 5. However, since it is the client side that selects the frame, information regarding the frame selected by the client side, is classified into the client side information similarly to the frame information. The "client side" called here, means the information regarding the content of the request.

(1e) Client Side Framing Information

Then, the client side framing information which is one of the characteristics of this embodiment, is the information regarding a framing process. In other words, the framing content is obtained from the client side framing information included in the client side information. As the client side framing information, specifically, information whether or not framing is performed at the client side, information whether or not a frame is heated when the spectacle lens is fitted into the frame, or information what temperature is selected if heating is performed, and further information regarding a fastening degree of the spectacle lens into the frame during framing, can be given. Some of the spectacle shops or clients have a preference for more tightly fastening the spectacle lens into the frame depending on a case. In this embodiment, regarding a difference between the frame and a size of the spectacle lens as well, which is a preference of the client side, the fastening degree is also finely converted to a numerical value by incorporating the "client side framing information" in a matrix.

In addition, of course, information required for manufacturing a spectacle lens may be prepared as the client side information. For example, "layout information" can be given. The information belonging to the layout information includes a pupil distance (pupil distance for distance vision and pupil distance for near vision), pupil height, and fitting point (eye point), etc.

1-B) Manufacturing Side Computer 2

The manufacturing side computer 2 refers to a computer installed at a side of manufacturing a spectacle lens. Edging information required for manufacturing a spectacle lens by the edger 6, is acquired under the manufacturing side environment, so that the spectacle frame is fitted into the frame even under the ordering side environment. The edging information will be described later.

The manufacturing side computer 2 has a function as a computer. A plurality of manufacturing side computers 2 may exist in the system.

Further, a controller is present in the manufacturing side computer 2, for managing and controlling various information required for manufacturing a spectacle lens, and for managing and controlling each unit provided in the manufacturing side computer. However, a specific structure of the controller may be realized using a publicly-known technique, and detailed explanation therefore is omitted here.

The structure provided in the manufacturing side computer 2 is as follows:

the edger 6 for actually manufacturing the spectacle lens by edging a lens to be edged, the information memory part 7 for storing the matrix prepared by converting the relationship between the framing content and the frame type, the calculation part 8 for calculating edging information, the edging information acquisition part 9 for acquiring edging information calculated in consideration of the framing content.

1-B-a) Edger 6

The edger 6 is configured to edge the spectacle lens for framing it into the frame. The spectacle lens to be edged (called an "unedged lens") is provided by being designed and manufactured by a lens maker, and refers to a lens in a state that it is not edged so as to suit to the frame shape. Generally, the uncut lens having a round outer shape is treated as the unedged lens. In the edging by the edger 6, rough edging and finish edging are performed. The rough edging is an edging step of edging the spectacle lens into a shape one size larger than a finish shape of a final lens.

The finish edging is the edging performed to the spectacle lens in accordance with the finish shape of the final lens, and which is the edging step including bevel edging. The bevel edging refers to the edging of forming a bevel (for example, mountain-shaped bevel V-groove shaped bevel (grooving), and plano-bevel, etc.) on an outer circumferential surface of the spectacle lens.

The rough edging and the finish edging may be performed by changing the edging tool in each step, or may be performed by using the same edging tool. Further, an edging system of the rough edging and the finish edging may be changed in each step, like cutting for the rough edging, and grinding for the finish edging, or the same edging system may be used. Further, mirror-finish may also be included in the finish edging as needed. The mirror finish is the processing of giving a polish to an edging surface of a lens by a tool with a fine texture.

(2) Manufacturing Side Information (2a) Edger Information

Edger information can be mainly given as the manufacturing side information. The edger information is the information regarding the edger 6 itself, and for example corresponds to information regarding edging propriety, or information regarding edging parameters, etc. The information regarding the edging propriety includes maximum/minimum edging diameters that can be edged, maximum/minimum edge thickness that can be edged, and a lens material that can be edged, etc., for example. The edging parameters include a tool shape of the edging tool, a tool diameter, and a bevel shape to be edged, etc., for example.

(2b) Manufacturing Side Framing Information

Then, the manufacturing side framing information which is one of the characteristics of this embodiment, is the information regarding a framing process. In other words, the framing content is obtained from the manufacturing side framing information included in the manufacturing side information. As the manufacturing side framing information, specifically, information whether or not the framing is performed at the manufacturing side, information whether or not the frame is heated when the spectacle lens is fitted into the frame, or information what temperature is selected during heating, can be given.

When the calculation part is provided outside (for example server) of the manufacturing side computer, a manufacturing side transmission part may be separately provided for transmitting the above information to the calculation part. However, in this embodiment, since the calculation part is provided in the manufacturing side computer, description such that the manufacturing side transmission part having a function of transmitting the manufacturing side information to the calculation part, is omitted.

1-B-b) Information Memory Part 7

In each kind of the abovementioned information, the information memory part 7 has a function of storing the relationship between the framing content and the frame type, which is converted to the matrix. Then, the size correction value is the numerical value in this matrix, which is the value for correcting the edging size of the spectacle lens to perform framing satisfactorily.

In this embodiment, two matrixes are prepared, and a value obtained by each matrix A and B is positioned as a size correction value A and a size correction value B, and both values together are defined as a size correction value.

The size correction value will be described hereafter.

(3a) Size Correction Value A

The size correction value A is a numerical value in the matrix when a relationship between a tracer type and a frame type is converted to the matrix A. FIG. 2 is a specific example of the matrix A.

In the matrix A of FIG. 2, the frame type is divided in each raw. Specifically, the frame type is roughly divided by presence/absence of a rim, and is subdivided by a material of the frame.

On the other hand, a client type and a tracer type, are divided in each line. In this embodiment, the fastening degree of the spectacle lens into the frame is already reflected on the numerical value in the matrix. Therefore, a mechanism is as follows: if the client side is actually selected from the client type, the size correction value A reflecting the preference of the client side regarding the fastening degree, can be naturally obtained.

The numerical value in the matrix of FIG. 2 is a correction value for a lens diameter (radius), for performing correction at a unit of ($1/100$) mm. However, other case is also acceptable.

For example, there is a frame regarding the frame type, and when the material of the frame is 02, the tracer type is T1, and the client side is 03, the size correction value A is 0.05 mm.

(3b) Size Correction Value B

The size correction value B is the numerical value in the matrix when the relationship between either one of the client side and the manufacturing side performing the framing step, the necessity/non-necessity of heating the frame and the degree of the heating, and the frame type, is converted to matrix B. FIG. 3 shows a specific example of the matrix B.

In the matrix B of FIG. 3, the frame type is divided in each row similarly to the matrix A, and is divided by presence/absence of the rim, and meanwhile is further subdivided by the material of the frame. Note that similarly to the matrix A, the unit of the size correction value B in the matrix B is also set to ($1/100$) mm. However, other case is also acceptable.

On the other hand, whether or not the framing is performed at the manufacturing side, or whether or not heating is performed to the frame during framing, is divided in each row. In this embodiment, the degree of heating applied to the frame is already reflected on the numerical value in the matrix. Therefore, a mechanism is as follows: by selecting whether or not the framing is performed at the manufacturing side, and whether or not heating is performed to the frame, the size correction value B reflecting the degree of heating the frame, can be naturally obtained. The degree of heating is preferably set to a temperature numerical value previously known from the client side or the manufacturing side. However, it is also acceptable that if an expansion rate corresponding to the material of the frame is known, the following processing may be performed: namely, a frame deformation amount is calculated in accordance with the degree of heating the frame (heating temperature), and the frame deformation amount is reflected on the size correction value B.

For example, as shown in FIG. 3, when the client side (spectacle shop) is 03, and the frame type is a full rim type, and the material of the frame is 02, and the framing is performed and heating is performed to the frame at the client side, the size correction value is 0.10 mm.

As a result, the size correction value A is 0.05 mm, and the size correction value B is 0.10 mm, and therefore as a total value of them, the size correction value is 0.15 mm. In this embodiment, the size correction value A and the size correction value B are simply added to each other. However, it is also acceptable that either one of the size correction values is weighed to finally obtain the size correction value, so as to correspond to the content of the manufacturing step of the spectacle lens.

In addition, as a method of determining the numerical value in the matrix, the numerical value is determined in accordance with a specific action performed in the framing step and a specific tracer type. As an example, the numerical value is set to +0.05 when heating is performed, and the numerical value is set to +0.05 mm when the preference is that the lens is more tightly fastened than usual, and the numerical value is set to −0.05 mm when the tracer is used, and a technique of increasing/decreasing each numerical value may be used in accordance with the frame type. Also, a system administrator at the manufacturing side may determine the numerical value in the matrix. Even if the administrator tentatively determines the numerical value in the matrix, and even if the numerical value is not suitable for the framing, the numerical value in the matrix may be corrected under a feedback from a report of the client side computer or the manufacturing side computer (namely, a framing side).

An example of the method of determining the numerical value in the matrix will be descried hereafter. Of course, in the present invention, the method of determining the numerical value in the matrix is not limited to the matter described below.

The following three steps are performed as a preparation. First, calibration is performed to the tracer. Namely, when the frame having a shape of a diameter 50 mm is measured, calibration is performed so that shape data of the spectacle lens with a diameter of 50 mm is obtained.

Further, the edger is also adjusted. Namely, when edging is performed to a lens to be edged so as to obtain a spectacle lens having a desired lens shape with a diameter of 50 mm, a tool diameter is changed so as to obtain the spectacle lens with a diameter of 50 mm when it is measured with an apex of a bevel of the spectacle lens as a reference.

Then, the calibration is also performed to a circumferential length measurement device. Namely, when a sample is measured, the sample having a diameter of 50 mm at the time of a measurement with the apex of the bevel as a reference, the calibration is performed so that a circumferential length is a length corresponding to the diameter of 50 mm. Such a circumferential length measurement device is used for confirming whether or not the circumferential length of the spectacle lens actually manufactured is largely deviated from an ideal circumferential length. When it is largely deviated, the spectacle lens is re-edged or discarded.

Here, the circumferential length measurement device is also used for judging a quality of the spectacle lens in advance.

After the abovementioned preparation is performed, the lens to be edged is actually edged in accordance with the frame type. Then, the size correction value A for an optimal framing, is determined in accordance with the frame type. At this time, when the frame is a plastic frame, the size correction value A is varied depending on whether or not the frame is heated. Therefore, regarding both cases of not heating the frame and heating the frame, size correction values A1 and A2 for the optimal framing may be respectively determined, or regarding a case when the frame is heated, a difference between a size correction value A1 at the time of not heating the frame, and a size correction value A2 at the time of heating the frame, may be used as the size correction value B.

The "optimal framing" which is a base of preparing the size correction value A, may be the framing considered to be optimal for the manufacturing side. If the client side requests the spectacle lens that can be framed satisfactorily, which is the optimal framing for the client side, the size correct value B reflecting the preference of the client side may be determined in the matrix having the size correction value B.

1-B-d) Calculation Part 8

The calculation part 8 of this embodiment has a function of calculating the edging information (4). The edging information is calculated based on the client side information (1), the manufacturing side information (2), and the size correction value (3) transmitted from the information memory part 7.

The edging information calculated here is calculated, first, by performing a "first calculation" for calculating a scheduled edging shape of the spectacle lens in consideration of a factor other than the framing content, and a "second calculation" in consideration of the relationship between the framing content and the frame type. The first calculation and the second calculation will be described hereafter.

(First Calculation)

First, basic edging information is calculated, for edging the spectacle lens into a scheduled edging shape, in consideration of the factor other than the framing content. A publicly-known method may be used for calculating the basic edging information. Also, a publicly-known parameter may be used. As an example of the basic edging information, the client side information of the spectacle lens including the spectacle lens information, the frame information, the prescription value information, and the ordering side area information, and the spectacle lens manufacturing side information including the edger information, can be given.

When the basic edging information is transmitted to the manufacturing side from the ordering side, usually, the basic edging information that can be acquired by the ordering side, is transmitted. Then, at the manufacturing side, the transmitted basic edging information (client side) and the basic edging information (manufacturing side) possessed by the manufacturing side, are combined, to thereby prepare all basic edging information. Thereafter, even if there is a case of using the expression of "the basic edging information is transmitted", this expression does not necessarily mean that all basic edging information is transmitted, but means that the basic edging information in a range of the transmitting side is suitably transmitted.

(Second Calculation)

In the second calculation, as described above, the size correction value is calculated by the calculation part 8, based on the relationship been the framing content and the frame type. Then, the size correction value is taken into consideration for the basic edging information.

At this time, the calculation part 8 receives at least the frame information (1c), the client side framing information (1e), and the manufacturing side framing information (2b).

By acquiring the frame information including the frame type, data regarding a partial shape into which the spectacle lens is fitted, can be obtained. In other words, this shape is an outer shape possessed by the spectacle lens. Then, by taking the size correction value into consideration, the variation is provided to a target outer shape in accordance with the preference of the client side or the manufacturing side framing content. For example, when the manufacturing side performs framing by heating the frame, the size of the frame is enlarged. Therefore, the manufacturing side manufactures the spectacle lens, following the "edging information" calculated by more largely setting the outer shape of the spectacle lens than scheduled.

Thus, the edging information in consideration of the relationship between the framing content and the frame type, is calculated based on the client side information, the manufacturing side information, and the size correction value transmitted from the information memory part 7. Thereafter, the edging information is transmitted to the edging information acquisition part 9.

1-B-e) Edging Information Acquisition Part 10

(4) Edging Information

The edging information acquisition part 9 of this embodiment has a function of acquiring the edging information calculated in consideration of the relationship between the framing content and the frame type.

As the edging information acquisition part 9, an arbitrary one may be used if the edging information calculated by the above method can be obtained. For example, a recording part for recording the edging information may be provided, or a structure of transmitting the edging information to the edger 6 of the spectacle lens may be provided.

1-C) Others

Of course, a structure other than the abovementioned each part may be provided in the edging information acquisition system of this embodiment. For example, the recording part for recording each kind of information as described above, a server, and the communication line 3, etc., may be separately provided. Further, a portion named as " . . . acquisition part" in the abovementioned each part, may have the recording part.

Each of the abovementioned information may be the information recorded in the recording part provided in the client side computer 1. When the client has the same type of the spectacle lens manufactured before, information recorded in the recording part may be transmitted to the calculation part 8.

2. Spectacle Lens Manufacturing Device

The above-described embodiment shows a case that a role sharing is performed between the client side computer 1 and the manufacturing side computer 2, to acquire the edging information. On the other hand, one of the characteristics of the present invention is to acquire the edging information based on the relationship between the framing content and the frame type which are the base of calculating the edging information. Therefore, the present invention is reflected on a device for manufacturing the spectacle lens by acquiring and based on the edging information calculated based on the matrix prepared by converting the relationship between the framing content and the frame type.

The spectacle lens manufacturing device called here may have at least the edging information acquisition part 9. Of course, each part excluding the edging information acquisition part 9 may be suitably provided. Further, it is preferable that the spectacle lens manufacturing device includes all parts excluding the client side transmission part 4, out of the abovementioned each part. Thus, the manufacturing side can acquire the edging information, and the manufacturing side can manufacture the spectacle lens in accordance with the edging information.

A preferable embodiment of the spectacle lens manufacturing device has been described in the abovementioned preferable embodiment of each part constituting the spectacle lens manufacturing system. The spectacle lens manufacturing system including preferable each part, is the preferable embodiment of the spectacle lens manufacturing device.

3. Program for the Spectacle Lens Manufacturing System

The present invention is also reflected on the program for the spectacle lens manufacturing system for causing a computer to function as the edging information acquisition part 9 that acquires edging information, after calculating the edging information based on the environment information and the spectacle lens deformation information, thus having a great technical characteristic. Of course, the present invention is also reflected on a recording medium in which the program is stored, thus having a great technical characteristic.

The "program for the spectacle lens manufacturing system" called here is acceptable if it can cause the computer to function as at last the edging information acquisition part 9 installed on each computer and under an instruction from the controller. Of course, the computer may be suitably caused to function as each part excluding the edging information acquisition part 9. Further, it is preferable that the computer is caused to function as the abovementioned each part including the edging information acquisition part 9.

A preferable embodiment of the program for the spectacle lens manufacturing system has been described in the abovementioned preferable embodiment of each part constituting the spectacle lens manufacturing system. The program including each part considered to be preferable in the spectacle lens manufacturing system, is the preferable embodiment of this program.

4. Spectacle Lens Manufacturing Method

Figure 4:
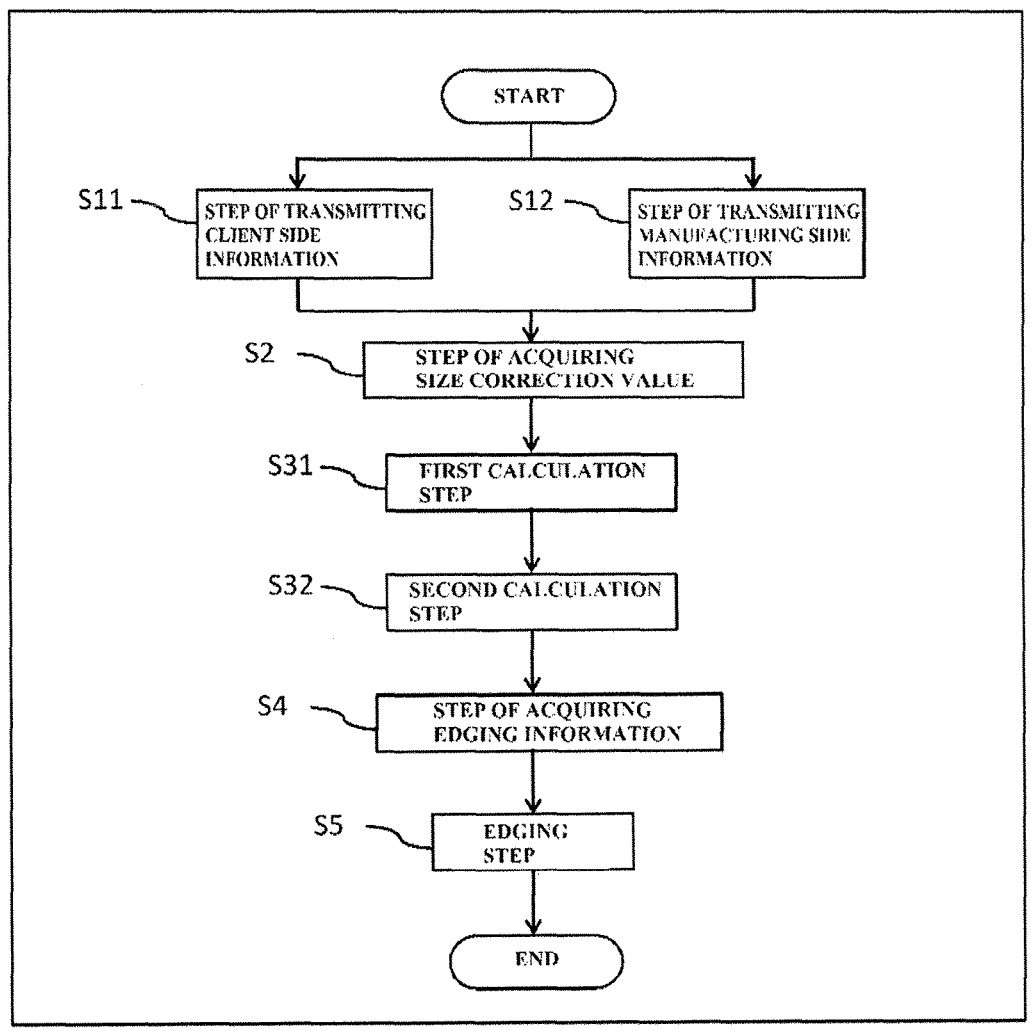
FIG. 4 is a flowchart showing a procedure of manufacturing a spectacle lens according to this embodiment.

A specific procedure of manufacturing a spectacle lens will be described using FIG. 4. FIG. 4 is a flowchart showing the procedure of manufacturing a spectacle lens according to this embodiment.

(S11 Step of Transmitting the Client Side Information)

First, in order to perform a first calculation by the calculation part 8 of the manufacturing side computer 2, various information is collected to the calculation part 8.

The client side information including the spectacle lens information, the frame information, the prescription value information, and the ordering side area information, is transmitted to the calculation part 8 by the client side transmission part 4 from the client side computer 1.

(S12 Step of Transmitting the Manufacturing Side Information)

The manufacturing side information including the edger information is transmitted to the calculation part 8 from the edger 6 connected to the manufacturing side computer 2.

(S2 Step of Acquiring Environment Information)

On the other hand, in order to acquire the size correction value, the frame information, the tracer information, and the client side framing information are transmitted to the information memory part 7 from the client side transmission part 4 of the client side computer 1. The information memory part 7 acquires the size correction value based on the matrix.

(S31 First Calculation Step)

Thereafter, a first calculation is carried out by the calculation part 8. Namely, the basic edging information is calculated.

(S32 Second Calculation Step)

Then, a second calculation is carried out by the calculation part 8. Namely, correction using the size correction value is performed, the size correction value being obtained by the relationship between the framing content and the frame type, used for the basic edging information, which is the numerical value of adding the size correction value A and the size correction value B to each other.

(S5 Step of Acquiring Edging Information)

The edging information is calculated by the abovementioned first calculation and second calculation. Then, the edging information is recorded in the edging information acquisition part 9.

(S5 Edging Step)

Thereafter, the edging information is transmitted to the edger 6 by the edging information acquisition part 9. Then, the spectacle lens that can be framed satisfactorily can be manufactured by the edger 6 in accordance with the edging information, even if either one of the client side and the manufacturing side performs framing, and any kind of framing process is performed.

5. Effect of this Embodiment

In this embodiment, the following effect is exhibited by taking into consideration the relationship between the framing content and the frame type, for the edging information which is the base of manufacturing the spectacle lens at the manufacturing side.

First, when the framing is performed at the ordering side, the edging information in consideration of its own unique framing content at the ordering side is calculated, and when the framing is performed at the manufacturing side, the edging information in consideration of its own unique framing content at the manufacturing side is calculated. Therefore, the spectacle lens that can be framed with high precision, can be provided, regardless of the client side or the manufacturing side that performs the framing. Then, the spectacle lens can be provided, in response to the request of an individual client, or in response to an individual tracer 5. This means that there is no necessity for the client side and the manufacturing side to have a load of accumulating a rule in a one-to-one relationship, thereby remarkably reducing the load of the manufacturing side. In other words, this means that a system capable of supplying the spectacle lens that can be framed satisfactorily can be constructed, regardless of how much the preference of the client side or the manufacturing side is reflected on the framing.

By the system of this embodiment, it becomes possible to respond to a diversification of the request of the individual client because there is no necessity for confirming the framing content every time the order is received, thus making it possible to improve a situation that the framing process can be performed with high precision only by a determined ordering side and a determined manufacturing side. As a result, the diversified client's needs can be speedily responded, and international competitiveness of the manufacturing side can be improved.

Further, according to the system of this embodiment, even if there are a plurality of client side computers 1 and manufacturing side computers 2, unlike the conventional case, the spectacle lens can be manufactured so as to be framed into the frame satisfactorily in accordance with each computer. Such a merit is extremely great in the present situation in which globalization is progressed.

As described above, according to this embodiment, the system, etc., can be provided for globally and speedily manufacturing the spectacle lens that can be framed into the frame satisfactorily, regardless of the place of the client side or the manufacturing side of the spectacle lens.

6. Modified Example

A technical range of the present invention is not limited to the above-described embodiment, and includes an embodiment variously modified or improved, in a range capable of deriving a unique effect obtained by the features of the invention or a combination of them.

(Installment Place of Each Part Structure)

The above-described embodiment shows a case that the abovementioned each part structure is installed in either the client side computer 1 or the manufacturing side computer 2. Meanwhile, the abovementioned each part structure is not necessarily required to be present in either the client side computer 1 or the manufacturing side computer 2. For example, it is also acceptable that the calculation part 8 is installed in another computer or server, and the client side information, the manufacturing side information, the environment information, and the lens deformation information are transmitted to the calculation part 8, and the edging information is calculated by the computer or the server. Then, the following structure may be acceptable: namely, the edging information is transmitted to the edging information acquisition part 9 installed in the manufacturing side computer 2.

However, the edging information is the information to be acquired finally in the actual edging, and therefore the edging information acquisition part 9 is preferably present in the manufacturing side computer 2. The client side transmission part 4 is also preferably present in the client side computer 1 as its name suggests, because the client side information is transmitted to the calculation part 8.

(Size Correction Value)

The above embodiment shows a case that the "client type", "tracer type", and "frame type" are employed as components of the matrix for determining the size correction value A, and shows a case which side of the client side and the manufacturing side performs the framing" "whether or not heating is performed to the frame", and "the frame type" are employed as the components of the matrix for determining the size correction value B.

On the other hand, the framing content is converted to the numerical value, and this numerical value may be reflected on the size of the spectacle lens during framing. Therefore, if the relationship between the "framing content" and the "frame type" is reflected on the component constituting the matrix for determining the size correction values A and B, an arbitrary combination may be acceptable. Originally, only one matrix may be provided, or three or more matrixes may be provided. Further, not the size correction values A and B, but one size correction value may be acquired.

According to the above-described embodiment, a role sharing is performed in such a manner that the size correction value A is the "information relating to the client side", and the size correction value B is the "information relating to the manufacturing side".

On the other hand, the size correction value A may be acquired from the matrix of the relationship between the "tracer type" and the "frame type", namely, from the matrix showing the relationship between the "content not relating to the framing step" and the "frame type".

Simultaneously, the size correction value B may be acquired from the matrix showing the relationship of the "client type", "which of the client side and the manufacturing side performs framing", "whether or not heating is performed to the frame", and "frame type", namely, the relationship between the "content relating to the preference and a unique technique" which is the "content relating to the framing step", and the "frame type".

Thus, even if the framing party changes the framing content, only the matrix B regarding the size correction value B may be corrected. Then, the size correction value A is not required to be corrected. Then, the size correction value A is not required to be corrected. Namely, even if the framing content is changed, there is no necessity for changing all numerical values in the matrix, and labor is divided in such a manner that the client side manages the size correction value A and an actual framing party manages the size correction value B, and an improvement of a production efficiency of the spectacle lens can be expected.

(Calculation Part 8)

In the above-described embodiment, the first calculation and the second calculation are carried out by the calculation part 8 in the manufacturing side computer 2. Meanwhile, it is also acceptable that the calculation part 8 is provided in the client side computer 1, and a structure capable of freely acquiring the manufacturing side information (for example, a manufacturing side information reception part, although not shown) is provided, and the first calculation and the second calculation are carried out by the calculation part 9 of the client side computer 1. Also, role sharing may be performed in such a manner that the first calculation is carried out by the calculation part 8 of the client side computer 1, and the second calculation is carried out by the calculation part 8 of the manufacturing side computer 2.

For example, when the role sharing is performed in such a manner that the size correction value A is the "information relating to the client side", and the size correction value B is the "information relating to the manufacturing side", the size correction value A may be calculated by the calculation part provided in the client side computer, and the size correction value B may be calculated by the calculation part provided in the manufacturing side computer.

Further, the other portion of the first calculation may be performed by other place (the manufacturing side computer 2 or the calculation part 8 installed in another computer or server), while the first calculation is partially performed by the client side computer 1. Also, the outer shape of the spectacle lens which is the base of the size correction of the spectacle lens, is calculated by the first calculation from the frame information, and the size correction value may be taken into consideration for the outer shape of this spectacle lens.

Embodiment 2

As described in the abovementioned embodiment, in this embodiment, even in a case that there a plurality of manufacturing side parties (manufacturing party X and manufacturing party Y), first, the manufacturing party X manufactures the spectacle lens in consideration of its own unique framing content, and regarding the spectacle lens not manufactured by the manufacturing party X, the manufacturing party Y manufactures this spectacle lens. During this manufacture, the manufacturing party Y performs calculation of edging information β inconsideration of its own unique framing content.

Figure 5:
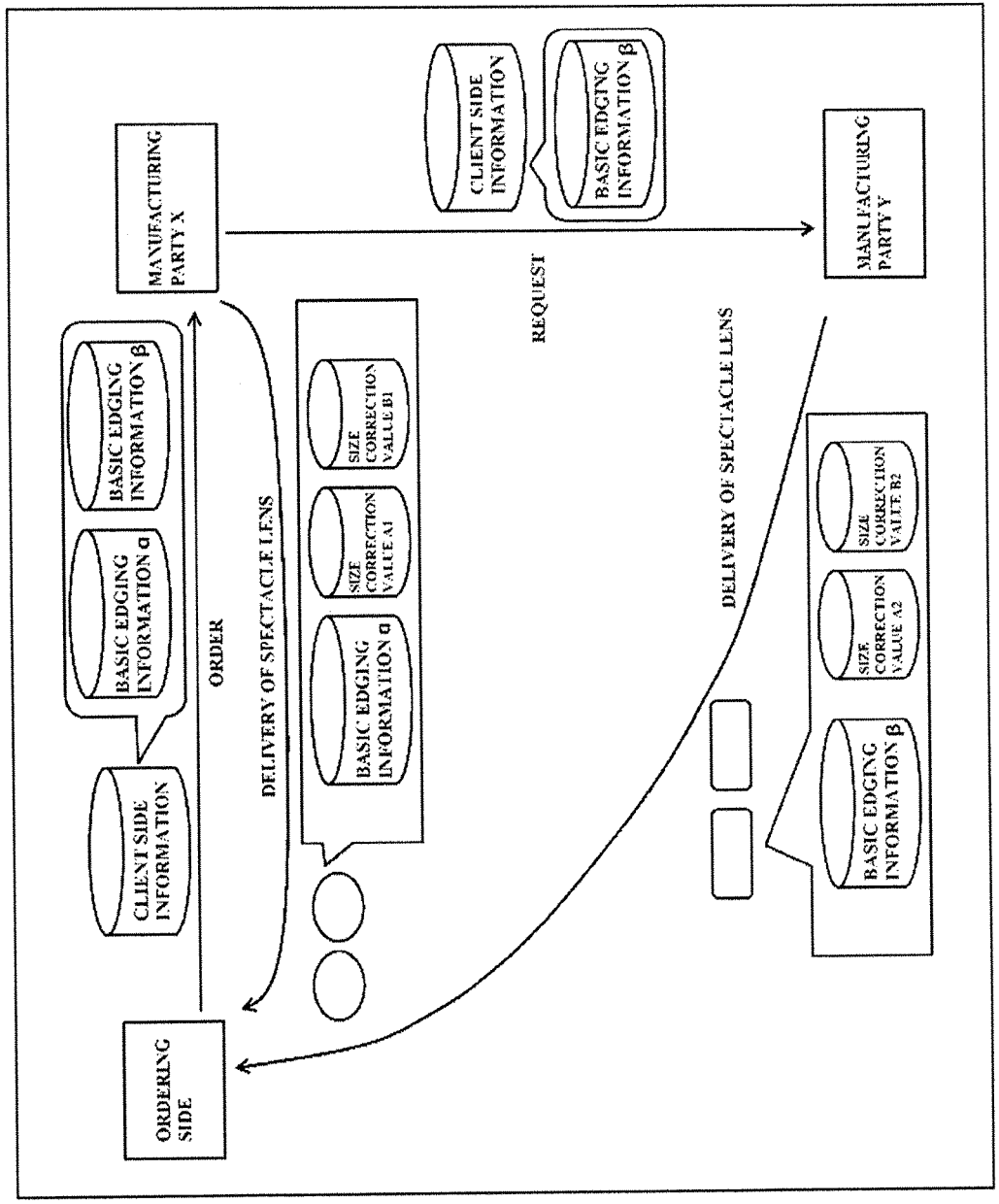
FIG. 5 is a schematic explanatory view regarding a spectacle lens manufacturing system according to embodiment 2.

This embodiment will be described hereafter, using FIG. 5. FIG. 5 is a schematic explanatory view showing the spectacle lens manufacturing system according to another embodiment. Similarly to the abovementioned embodiment, the client side computer 1 and the tracer 5 are provided at the ordering side (spectacle shop) in FIG. 5. The manufacturing side computer 2 and the edger 6 are provided at the manufacturing side. The same thing can be said for "Embodiment 3" described hereafter.

Further, this embodiment shows a case that a part of the calculation (first calculation) of the basic edging information is carried out at the ordering side. Specifically, the ordering side calculates the information that can be calculated at the ordering side, out of the basic edging information. Namely, in this embodiment, a part of the calculation part 8 of the [Embodiment 1] is also provided in the client side computer 1. The same thing can be said for the [Embodiment 3] described hereafter. As an example of the basic edging information transmitted to the manufacturing side from the ordering side, the basic edging information other than the manufacturing side information that can be calculated by the manufacturing party A like the edger information, can be given.

Hereafter, if unless otherwise specified, the basic edging information transmitted to the manufacturing party A from the ordering side, is the basic edging information (client side) excluding the edger information, and the basic edging information is obtained by combining with the basic edging information (manufacturing side) possessed by the manufacturing party A. Further, the basic edging information transmitted to the manufacturing party B from the manufacturing party A is also the basic edging information excluding the edger information, and the basic edging information is obtained by combining with the basic edging information (manufacturing side) possessed by the manufacturing party B.

First, the spectacle shop which is the ordering side, transmits the basic edging information to the manufacturing side computer 2 of the manufacturing party X. During transmission, basic edging information α for the spectacle lens manufactured by the manufacturing party X is calculated, and basic edging information β for the spectacle lens manufactured by the manufacturing party Y is calculated. Each basic edging information may be transmitted to each manufacturing party. The same thing can be said for the [Embodiment 3] described hereafter.

Incidentally, in this embodiment, the basic edging information α and the basic edging information β are described separately from each other. This is because as shown in FIG. 5, the manufacturing parties X and Y manufacture the spectacle lens of different shapes. The client side information of this embodiment includes data regarding the outer shape (approximately oval) of the spectacle lens to be manufactured by the manufacturing party X, and also includes data regarding the outer shape (approximately rectangular) of the spectacle lens to be manufactured by the manufacturing party Y. Of course, when the manufacturing parties X and Y manufacture the spectacle lens of the same shape, common basic edging information can be used.

Then, in the manufacturing computer 2 of the manufacturing party X, the size correction value is calculated using the matrix possessed by the manufacturing party X, and size correction values A1 and B1 are added to the basic edging information α, to thereby finally calculate the edging information α. Then, in accordance with this edging information α, the spectacle lens is manufactured by the edger 6 of the manufacturing party X.

On the other hand, when the manufacture of the spectacle lens not manufactured by the manufacturing party X is requested for the reason of the shape of the spectacle lens, the manufacturing party X requests another manufacturing party Y to manufacture the spectacle lens. At the time of the request, the client side information is transmitted to the manufacturing side computer 2 of the manufacturing party Y from the manufacturing side computer 2 of the manufacturing party X. Then, the manufacturing party Y calculates size correction values A2 and B2 in consideration of its own unique framing content using the matrix possessed by the manufacturing party Y, and these size correction values A2 and B2 are added to the basic edging information β. Then, the edging information β is finally calculated, and in accordance with this edging information β, the spectacle lens is manufactured by the edger 6 of the manufacturing party Y.

Namely, briefly speaking, when the framing is performed by the manufacturing party X, the manufacturing party X manufactures the spectacle lens in consideration of its own unique framing content.

Also, when the framing is performed by the manufacturing party Y, another manufacturing party Y also manufactures the spectacle lens in consideration of its own unique framing content.

Then, when the framing is performed at the ordering side, the spectacle lens is manufactured in consideration of its own unique framing content, even if either one of the manufacturing parties X and Y manufactures the spectacle lens.

The manufacturing party X may request the manufacturing party Y to calculate at least one of the size correction values. For example, a system of calculating the size correction value B by the manufacturing party Y by itself, while using the size correction value calculated by the manufacturing party X as the size correction value A.

By employing the above-described technique, the manufacturing party X is not required to manufacture all spectacle lenses, and the spectacle lens that can be fitted into the frame satisfactorily, can be manufactured in accordance with the type of the spectacle lens. In addition, the spectacle lens that can be fitted into the frame satisfactorily, can be speedily provided wherever the manufacturing party is present. Such a merit is extremely great in the present situation in which globalization is progressed.

In this embodiment, when the "client side" is the ordering side (spectacle shop), the "manufacturing side" is the manufacturing party X. Of course, although the manufacturing party X is interposed, the request of the spectacle shop is still received by the manufacturing party Y. On the other hand, the manufacture of the spectacle lens not manufactured by the manufacturing party X, is requested by the manufacturing party X, and therefore the "client side" can be regarded as the manufacturing party X. In this case, the "manufacturing side" is the manufacturing party Y. In this case, the manufacturing party X is a prime contractor, and the manufacturing party Y is a subcontractor. Of course, the manufacturing party Y may request another manufacturing party Z (another subcontractor) to perform a similar content as the content requested by the manufacturing party X.

Embodiment 3

As described in the beginning of the above-described embodiment, in this embodiment, when there are a plurality of manufacturing sides (the manufacturing party X and the manufacturing party Y), first, the manufacturing party X manufactures the spectacle lens in consideration of its own unique framing content, and regarding the spectacle lens not manufactured by the manufacturing party X, the manufacturing party Y manufactures this spectacle lens. During this manufacture, not the manufacturing party Y but the manufacturing party X previously obtains the manufacturing party Y's unique framing content, and performs calculation of the edging information β for the manufacturing party Y in consideration of the manufacturing party X's unique framing content.

Figure 6:
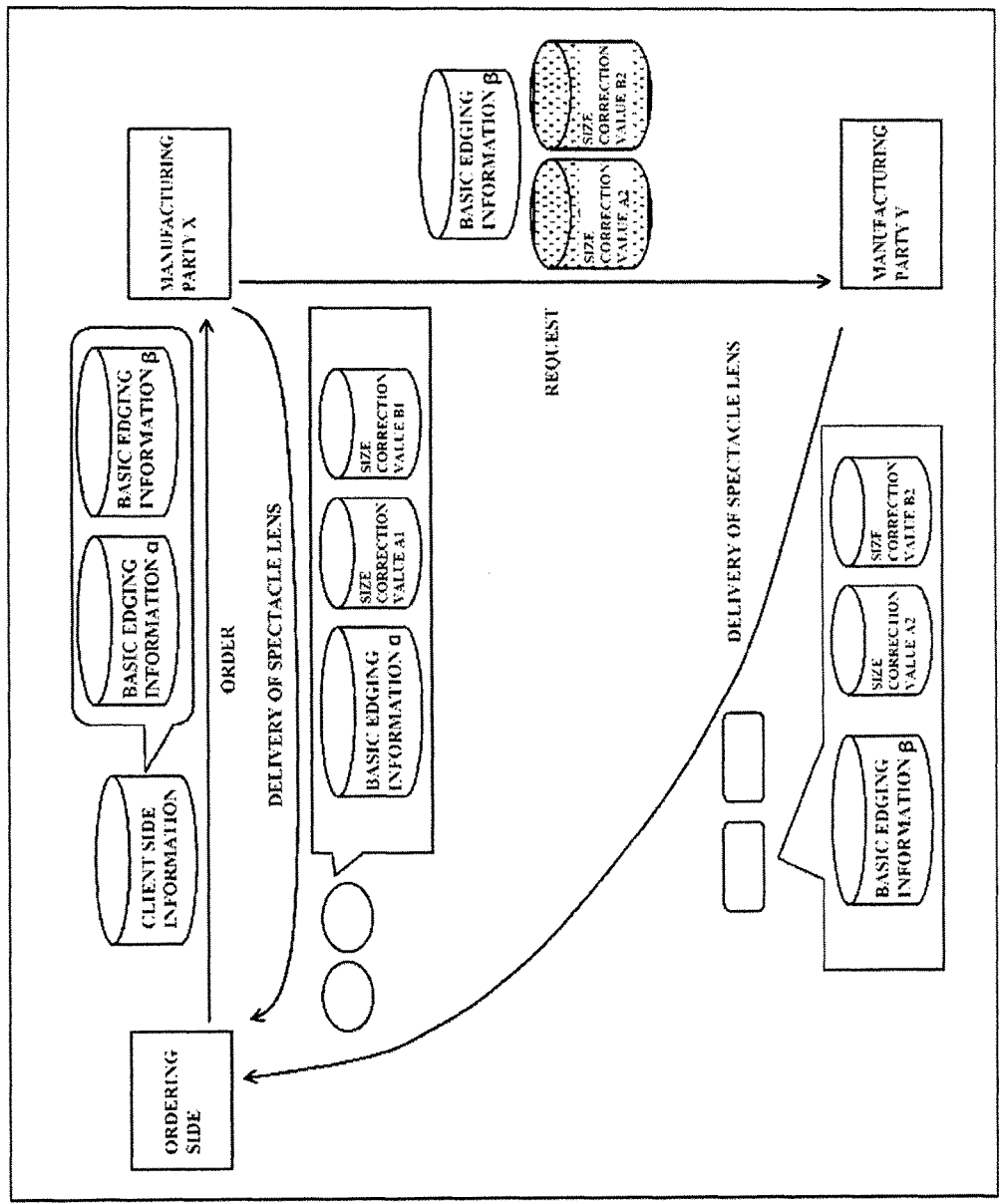
FIG. 6 is a schematic explanatory view regarding a spectacle lens manufacturing system according to embodiment 3.

This embodiment will be described hereafter, using FIG. 6. FIG. 6 is a schematic explanatory view of the spectacle lens manufacturing system according to another embodiment.

First, the spectacle shop which is the ordering side, transmits the basic edging information to the manufacturing side computer 2 of the manufacturing party X. During this transmission, the manufacturing party X calculates the basic edging information α for the spectacle lens manufactured by the manufacturing party X, and also calculates the basic edging information β for the spectacle lens manufactured by the manufacturing party Y.

On the other hand, when the manufacture of the spectacle lens not manufactured by the manufacturing party X is requested, for the reason of the shape of the spectacle lens, the manufacturing party X requests another manufacturing party Y to manufacture the spectacle lens. In this embodiment, unlike the "Embodiment 2", final edging information β is transmitted to the manufacturing side computer 2 of the manufacturing party Y from the manufacturing side computer 2 of the manufacturing party X when the request is given. Namely, in the manufacturing side computer 2 of the manufacturing party X, the manufacturing party Y's unique framing content is taken into consideration for the basic edging information β. Then, the manufacturing party X transmits the edging information β to the manufacturing party Y.

Namely, briefly speaking, when the framing is performed by the manufacturing party X, the manufacturing party X manufactures the spectacle lens in consideration of its own unique framing content. On the other hand, the manufacturing party X uses another manufacturing party Y as a subcontractor. The manufacturing party X calculates the edging information β in consideration of the manufacturing party Y's unique framing content, and transmits it to the manufacturing party Y. Then, the manufacturing party Y manufactures the spectacle lens as the subcontractor of the manufacturing party X. In addition, although the manufacturing party Y manufactures the spectacle lens as the subcontractor, the manufacturing party Y can manufacture the spectacle lens in consideration of its own unique framing content. Accordingly, the information memory part 7 (namely, matrix) and the calculation part 8 are not necessarily required to be provided in the manufacturing side computer 2 in the manufacturing party Y.

The above-described embodiment shows a case that the manufacturing party X obtains and knows the manufacturing party Y's unique framing content. On the other hand, when the ordering side (spectacle shop) performs the framing originally, there is no necessity for heating the frame by the manufacturing party Y. As a result, the manufacturing party X is not required to take the framing step of the manufacturing party Y into consideration for calculating the edging information α. Then, the size correction value calculated by the manufacturing party X can be used, and if this size correction value added to the basic edging information β, is transmitted to the manufacturing party Y, the manufacturing party X can use the manufacturing party Y as the subcontractor. Consequently, the manufacturing party X can make the manufacturing party Y manufacture the spectacle lens that can be framed satisfactorily similarly to the manufacturing party X.

By employing the above-described technique, an effect similar to the effect of the [Embodiment 2] can be obtained. In addition, there is no necessity for disclosing to the manufacturing party Y, each kind of technique or information for calculating the edging information β. When the manufacturing party Y is present in a foreign country, such a merit is extremely great in the present situation in which globalization is progressed.

Also, in this embodiment, regarding whether the "client side" corresponds to the spectacle shop or corresponds to the manufacturing party A, or regarding what is the "manufacturing side", the content described in [Embodiment 2] may be applied.

Embodiment 4

As described in the beginning of the above-described embodiment, this embodiment shows a case that the spectacle lens is manufactured not by its own side but by others, namely, shows a case that the management of the manufacturing information of the spectacle lens is focused.

Figure 7:
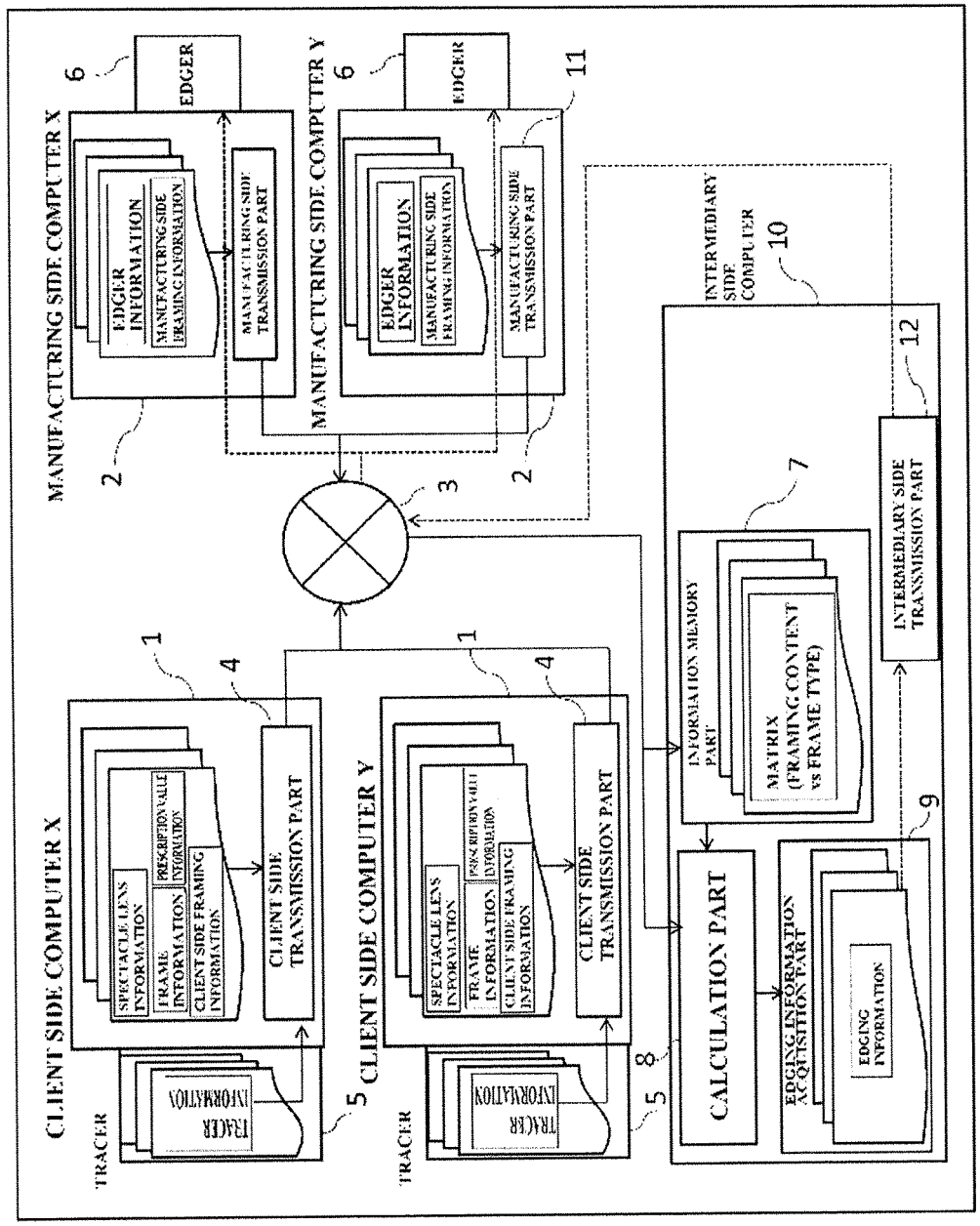
FIG. 7 is a schematic block diagram regarding a manufacturing information management system of a spectacle lens according to embodiment 4.

This embodiment will be described hereafter, using FIG. 7. FIG. 7 is a schematic explanatory view of the manufacturing information management system of the spectacle lens.

First, the client (namely, the spectacle shop) which is the ordering side acquires the client side information. Then, the client side information is transmitted to an intermediary side computer 10.

On the other hand, the intermediary side computer 10 is connected to the manufacturing side computer 2 possessed by the manufacturing parties X and Y who actually manufacture the spectacle lens. Then, the manufacturing side information is transmitted to the intermediary side computer 10 from the manufacturing side transmission part 11. This embodiment shows not a case that the edger information is transmitted to the calculation part 8 from the edger 6, but a case that the edger information recorded in the manufacturing side computer 2 is transmitted to the manufacturing side transmission part 11. As a transmission technique of transmitting the edger information, the technique of the above-described embodiment may be used, or the technique of this embodiment may be used.

Further, the intermediary side computer 10 also includes the "information memory part 7", "calculation part 8", and "edging information acquisition part 9" which are provided in the manufacturing side computer 2 in the abovementioned embodiment.

Then, in the "information memory part 7" and the "calculation party 8" in the intermediary side computer 10 of an intermediary party, the size correction value is calculated from the relationship between client side's or manufacturing party's unique framing content, and the frame type, to thereby finally calculate the edging information. Then, the calculated edging information is acquired by the edging information acquisition part 9. This edging information is transmitted to the manufacturing side computer 2 of each outside manufacturing party, by the intermediary transmission part 12 provided in the intermediary side computer 10. Then, the manufacturing parties X and Y manufacture the spectacle lens by each edger 6, in accordance with the edging information.

As described in the problem of the present invention, globalization of a manufacturing sector has progressed remarkably. With such a globalization, there is also an increased case of not manufacturing the spectacle lens by its own side who engages in a manufacturing industry. Namely, there is also an increased case of providing the edging information of the spectacle lens, to a manufacturing party who actually manufactures the spectacle lens. In such a situation as well, there is still a request to manufacture products speedily, regardless of a change in any situation. Rather, with a development of an information network, importance of managing the edging information described in the above embodiment, has been increased. Under such a circumstance, if edging for framing and framing can be performed with high precision only by the determined ordering side and the determined manufacturing side, diversified client's needs cannot be responded speedily, resulting in a remarkable reduction of international competitiveness of the manufacturing side.

However, by employing the above-described technique, persons who engage in the manufacturing sector can provide the spectacle lens that can be edged for framing and framed into the spectacle frame with high precision, even if they themselves are engaged in a manufacturing sector, or regardless of the place of the manufacturing plant at the manufacturing side, and further regardless of the place where the ordering party lives. In this point, a similar effect as embodiment 1 can be obtained.

Further, according to the system of this embodiment, even when there are a plurality of client side computers 1 and manufacturing side computers 2, the spectacle lens that can be framed into the spectacle frame satisfactorily in accordance with each computer, can be manufactured, unlike a conventional case. This merit is extremely great for the manufacturing party in the situation of globalization.

As described above, according to this embodiment, when the framing is performed at the ordering side, the edging information is calculated in consideration of the ordering side's unique framing content, and when the framing is performed at the manufacturing side, the edging information is calculated in consideration of the manufacturing side's unique framing content. As a result, the following system can be provided: namely, even if either the client side or the manufacturing side performs the framing, and whatever framing process is selected, the spectacle lens that can be framed satisfactorily can be globally and speedily manufactured.

Also, in this embodiment, regarding whether the "client side" corresponds to the spectacle shop or the manufacturing party X, and which side corresponds to the "manufacturing side", the content described in [embodiment 2] may be applied.

Further, a preferable embodiment of the spectacle lens manufacturing information management system, is described in the above "description of the preferable embodiment" of each part constituting the manufacturing system of the spectacle lens, excluding a point that the edger is not necessarily required to be provided. The system including each preferable part for manufacturing the spectacle lens, is the preferable embodiment of the information management system for manufacturing the spectacle lens.

Further, similarly to a description of embodiment 1, a preferable embodiment of the manufacturing information management device of the spectacle lens can be realized in the same manner as a preferable embodiment of each part constituting the spectacle lens manufacturing information management system. Also, in this embodiment, similarly to the program for a spectacle lens manufacturing system and the spectacle lens manufacturing method, the above-described effect can be exhibited in the program for the spectacle lens manufacturing information management system and the spectacle lens manufacturing information providing method.

Embodiment 5

As described in the beginning of the above-described embodiment, this embodiment shows an example of manufacturing the spectacle lens at the manufacturing side in consideration of the difference between the client side and the manufacturing side environments, as a modified example that can be added to the contents of [Embodiment 1 to embodiment 4]

By the above-described embodiment, it is true that the spectacle lens that can be framed satisfactorily, can be globally and speedily provided, even if either one of the client side and the manufacturing side performs framing.

However, as already described above, at present, globalization is remarkably progressed in the manufacturing sector. Therefore, the client side or the manufacturing side is more frequently present in foreign countries. Then, not only a case that the client side or the manufacturing side performs framing using various unique techniques, but also a case that a difference is generated between the client side environment and the manufacturing side environment, can be considered.

In this embodiment, such a difference between the client side environment and the manufacturing side environment is also taken into consideration for the edging for framing (edging for the spectacle lens). Thus, the spectacle lens that can be framed with high precision can be manufactured.

Explanation is given hereafter for a specific technique for reflecting the difference between the client side environment and the manufacturing side environment, on the edging for framing. A basic structure is the structure as described in [Embodiment 1], and this embodiment shows a portion where addition or change to/from [Embodiment 1]. Namely, the content not specified otherwise is the same as the content of [Embodiment 1], and a publicly-known content can also be used.

An outline of the spectacle lens manufacturing system of this embodiment is described following the [Embodiment 1] as follows. Note that a portion indicated by * is an added portion in this embodiment. Further, sings and numerals of each kind of information are suitably rewritten. There is no change in the signs and numerals in the figure.

Figure 8:
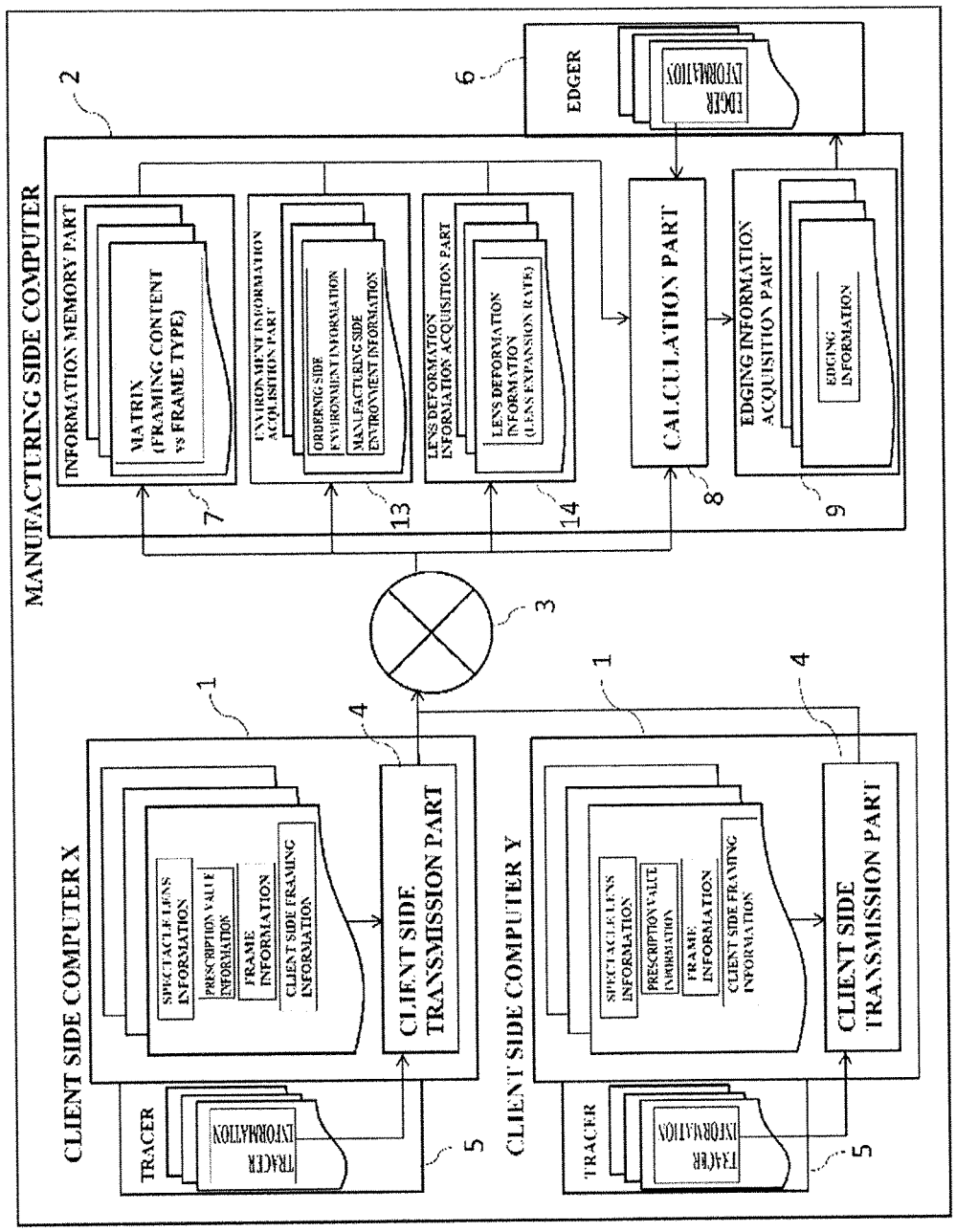
FIG. 8 is a schematic block diagram of a spectacle lens manufacturing system according to another embodiment.

1. A spectacle lens manufacturing system
  1-A) Client side computer
    1-A-a) Client side transmission part
  (5) Client side information
  (1a) Spectacle lens information
  (1b) Prescription value information
  (1c) Frame information
  (1d) Tracer information
  (1e) Client side framing information
  *(1f) Ordering side area information 1-B) Manufacturing side computer
   1-B-a) Edger
     (6) Manufacturing side information
       (2a) Edger information
       (2b) Manufacturing side framing information
       * (2c) Manufacturing side area information
   1-B-b) Environment information acquisition part
     (3) Size correction value
       (3a) Size correction value A
       (3b) Size correction value B
       *1-B-c) Environment information acquisition part
       *(4) Environment information
       *(4a) Ordering side environment information
       *(4b) Manufacturing side environment information
       * 1-B-d) Lens deformation information acquisition part
       *(5) Lens deformation information
   1-B-e) Calculation part
   1-B-f) Edging information acquisition part
     (6) Edging information
1-C) Others Also, similarly to the [Embodiment 1], FIG. 8 shows a schematic block diagram of the spectacle lens manufacturing system according to this embodiment.

(1f) Ordering Side Area Information

First, in this embodiment, ordering side area information (1f) is provided as the client side information (1).

The ordering side area information is the information as a trigger for acquiring the ordering side environment information described later. The place where the client lives, is given as the ordering side area information. Although details are described later, when the ordering side area information is transmitted by the client side transmission part 4 to the environment information acquisition part, the environment information acquisition part 13 acquires the environment information of the place where the client lives, namely the ordering side environment information, from a third party medium 8 such as weather information of Internet for example).

Usually, since the client lives in the neighborhood of the spectacle shop, the spectacle lens that can be framed with high precision at the spectacle shop, can be maintained in this highly precise framed state even at the place where the client lives. On the other hand, if the client lives in a place in a different environment of the spectacle shop, there is a possibility that a satisfactory framing state cannot be maintained finally, if the information of the area of the spectacle shop is used as the "ordering side area information". In this case, information regarding an address of the client may be set as the "ordering side area information". Namely, in this case, the "ordering side of a spectacle lens" indicates the "client". By thus setting the information, the effect of the present invention can be exhibited even in a case that the client does not live in the neighborhood of the spectacle shop.

(2c) Manufacturing Side Area Information

Then, similarly to the ordering side area information, in this embodiment, manufacturing side area information (2c) is provided as the manufacturing side information (2). The manufacturing side area information is the information as a trigger for acquiring the manufacturing side environment information described later. The place where a manufacturing side plant is present, is given as the manufacturing side area information. However, although described later, when the manufacturing side environment information can be acquired from a thermometer provided in the edger 6 and the manufacturing side computer 2, the manufacturing side area information is not required.

1-B-c) Environment Information Acquisition Part (4) Environment Information

The environment information acquisition part 13 of this embodiment has a function of acquiring the spectacle lens ordering side environment information (4a) and the spectacle lens manufacturing side environment information (4b), and has a function of receiving the ordering side area information (1f) transmitted from the client side transmission part 4. The ordering side area information (1f) is the information for specifying the ordering side environment information (4a).

(4a) Ordering Side Environment Information

The ordering side environment information is the information regarding an environment of an area where an ordering party lives, which is the information regarding the weather as a factor of giving a variation in a size of the spectacle lens. For example, a temperature at the time of an order or an average temperature at a scheduled delivery time, can be given as the environment information. Further, use of an average room temperature or an average water temperature can be given as the environment information. Also, humidity can also be used as the environment information. These information may be acquired from the third party media based on the ordering side area information.

(4b) Manufacturing Side Environment Information

The manufacturing side environment information is the information regarding an environment of an area where there is a plant for manufacturing the spectacle lens by the manufacturing party, which is the information regarding the weather as a factor of giving a variation in the size of the spectacle lens. For example, a temperature or an average temperature at the time of manufacture, can be given. Also, an average room temperature or an average water temperature in the plant, can be given. Also, humidity may be used as the environment information. These information may be acquired from the third party media (for example, weather information on the Internet), or may be acquired from the thermometer provided in the edger 6 and the manufacturing side computer 2. Variation in the size of the spectacle lens due to the environment, is simply called a "lens deformation amount.

This embodiment shows a case that the ordering side environment and the manufacturing side environment are different from each other. However, when the ordering side environment and the manufacturing side environment are not different from each other, or when there is only a difference between them so as not to allow a trouble to occur during framing of the spectacle lens, the edging information may be calculated without considering the lens deformation amount. Namely, a method of calculating the edging information is varied, depending on a degree of the difference between the ordering side environment and the manufacturing side environment. In order to determine whether to use any one of the methods, "a correction necessity/non-necessity judgment part based on the environment information (simply called a necessity/non-necessity judgment part hereafter)" may be separately provided in an appearance of connecting to the environment information acquisition part 13 and the lens deformation information acquisition part 14. A reference of judgment may be suitably determined according to a precision requested when framing the spectacle lens into the spectacle frame.

1-B-d) Lens Deformation Information Acquisition Part 14

(5) Lens Deformation Information

The lens deformation information acquisition part 14 of this embodiment has a function of acquiring the lens deformation information, and also has a function of receiving the spectacle lens information (1a) transmitted from the client side transmission part 4. The spectacle lens information (1a) is the information for specifying the lens deformation information (5). When the necessity/non-necessity judgment part judges that correction is required, the necessity/non-necessity judgment part transmits to the lens deformation information acquisition part 14 a command of "transmit the lens deformation information to the calculation part 8".

Then, the lens deformation information is the information regarding a relation between the environment information and the lens deformation amount, which is the information as a base of calculating the lens deformation amount between the case when the spectacle lens is present in the ordering side environment, and the case when the spectacle lens is present in the manufacturing side. As an example, a lens expansion rate can be given, which is set in a matrix constituted by the temperature difference and the spectacle lens material. Namely, the lens deformation amount can be calculated by the calculation part 8 described later, based on the environment information (temperature difference) and the lens deformation information (deformation amount in a radius value caused by the temperature difference).

Then, finally, in accordance with the edging information (6) in consideration of the lens deformation amount due to the difference between the ordering side environment and the manufacturing side environment, the spectacle lens is manufactured by the edger 6 under the manufacturing side environment, so that the spectacle lens is fitted into the frame, regardless of the place of the spectacle lens whether it is present at the client side or it is present at the manufacturing side.

1-B-d) Calculation Part 8

The calculation part 8 of this embodiment has a function of calculating the edging information (6) similarly to the above already described embodiment. The edging information is calculated based on the environment information (3) transmitted from the environment information acquisition part 7, and the lens deformation information (5) transmitted from the lens deformation information acquisition part 14, in addition to the client side information (1), the manufacturing side information (2), and the size correction value (3).

The edging information calculated here is calculated, first, by performing a "first calculation" which is already described in the embodiment (namely, calculation of the basic edging information not reflecting the framing content)" and a "second calculation (namely, calculation of the information reflecting the framing content)", and thereafter performing a "third calculation". The "third calculation" is the calculation in consideration of the lens deformation amount due to the difference between the ordering side environment and the manufacturing side environment, for the result of the "second calculation". The third calculation will be described hereafter.

A publicly-known method may be used for calculating the basic edging information in the first calculation, or a publicly-known parameter may be used. As an example, the client side information for manufacturing a spectacle lens including the spectacle lens information, the frame information, the prescription value information, and the ordering side area information can be given, and the manufacturing side information of a spectacle lens including the edger information can be given. Of course, the lens deformation amount is taken into consideration for the result of the "first calculation", which may be then further added to the result of the "second calculation".

(Third Calculation)

As described above, in the second calculation, the lens deformation amount is calculated by the calculation part 8, based on the environment information (temperature difference) and the lens deformation information (deformation amount due to the temperature difference). Then, the lens deformation amount is taken into consideration for the basic edging information.

Owing to the frame information, data regarding a partial shape into which the spectacle lens is fitted, can be obtained. In other words, this shape is an outer shape possessed by the spectacle lens. Then, based on the basic edging information in consideration of the lens deformation amount, the variation is provided to a target outer shape. For example, when the manufacturing side is present in the tropics, and the ordering side is present in a cold region, shrinkage of the spectacle lens occurs. Therefore, the manufacturing side manufactures the spectacle lens in accordance with the "edging information" calculated after largely setting the outer shape of the spectacle lens than expected.

Thus, the edging information in consideration of not only the framing content but also the lens deformation information due to the difference between the client side environment and the manufacturing side environment in addition to the framing content, is calculated by the calculation part 8, based on the client side information, the manufacturing side information, the size correction value transmitted from the information memory part 7, the environment information transmitted from the environment information acquisition part 13, and the lens deformation information transmitted from the lens deformation information acquisition part 14. Thereafter, the edging information is transmitted to the edging information acquisition part 9.

By using the abovementioned environment information and lens deformation information, the spectacle lens having a stable size not influenced by the difference between the ordering side weather and the manufacturing side weather, can be supplied. Further, when the necessity/non-necessity judgment part is provided, whether or not an additional size correction is required, is judged based on the difference between the ordering side weather and the manufacturing side weather. Only when it is judged that the additional size correction is required, a lens expansion value (namely lens deformation amount) set in the matrix showing the relationship between its own accumulated temperature difference and the material of the lens, is referenced, and this value is transmitted to the manufacturing side from the ordering side. Thus, not only a technical difference between a client side's framing content and a manufacturing side's framing content, but also the difference between the client side environment and the manufacturing side environment, is taken into consideration, and the spectacle lens having a stable size can be supplied. In addition, an extra calculation is not required to be performed depending on a case, thus making it possible to more speedily manufacture and provide the spectacle lens. However, it is a matter of course that even if the edging information is calculated in consideration of the environment information without providing the necessity/non-necessity judgment part, the effect of the present invention can be exhibited.

In addition, this embodiment has a great characteristic as the spectacle lens manufacturing device, the program for the spectacle lens manufacturing system, and the spectacle lens manufacturing method, for the same reason as the reason described in the [Embodiment 1].

Incidentally, the outline of the spectacle lens manufacturing method of this embodiment is described following the [Embodiment 1] as follows. Note that a portion indicated by \* is an added portion in this embodiment. Further, step numbers are suitably rewritten.

Figure 9:
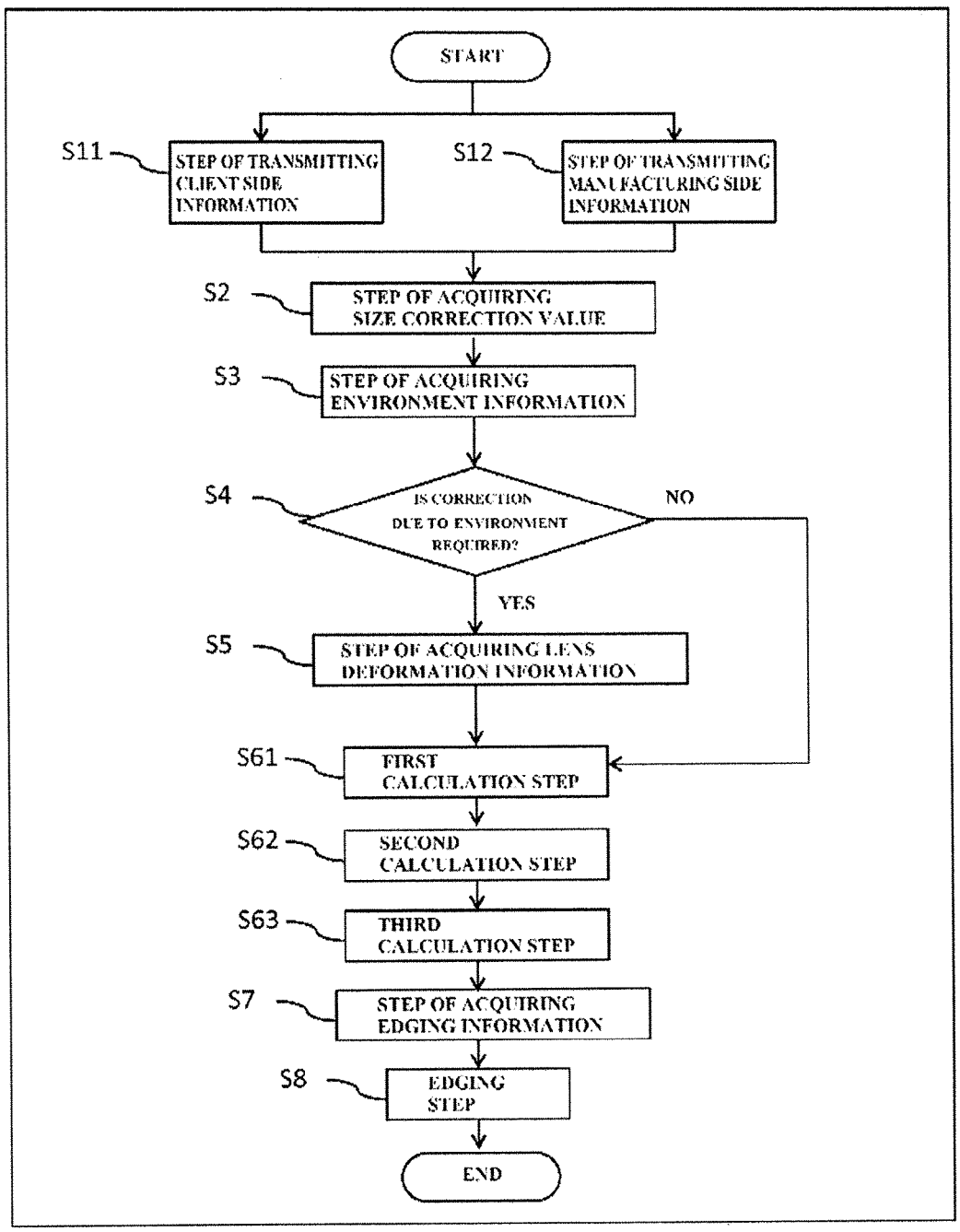
FIG. 9 is a flowchart showing a procedure of manufacturing a spectacle lens according to another embodiment.

S11 Step of transmitting client side information
S12 Step of transmitting manufacturing side information
S2 Step of acquiring size correction value
\*S3 Step of acquiring environment information
\*S4 Step of judging necessity/non-necessity of correction based on the environment information
\*S5 Step of acquiring lens deformation information
S61 First calculation step
S62 Second calculation step
\*S63 Third calculation step
S7 Step of acquiring edging information
S8 Edging step Further, similarly to [Embodiment 1], FIG. 9 shows a flowchart showing a procedure of manufacturing a spectacle lens according to this embodiment.

An order of the (S2 Step of acquiring size correction value) and the (S3 Step of acquiring environment information) may be random. Also, an order of the steps regarding the calculation may be switched.

(S3 Step of Acquiring Environment Information)

In order to acquire the environment information including the environment information at the ordering side of the spectacle lens, and the environment information including the environment information at the manufacturing side of the spectacle lens, the ordering side area information is transmitted to the environment information acquisition part 13 from the client side transmission part 4 of the client side computer 1. Based on the ordering side area information, the environment information acquisition part 13 acquires the information regarding a temperature of the area where an ordering party lives, via a public line. Simultaneously, the environment information acquisition part 13 acquires the information regarding a temperature in a manufacturing plant.

(S4 Step of Judging Necessity/Non-Necessity of Correction Based on the Environment Information)

In the necessity/non-necessity judgment part for performing correction based on the environment information, necessity/non-necessity for correction is judged based on the environment information.

If there is a difference between an ordering side temperature and a manufacturing side temperature in such a manner as damaging the precision of the previously set framing of the spectacle lens, it is judged that correction is required, and the processing is advanced to the following (S5 Step of acquiring lens deformation information).

On the other hand, otherwise, it is judged that the correction is not required, and the (S5 Step of acquiring lens deformation information) is skipped and the processing is advanced to (S61 First calculation step), (S62 Second calculation step), and (S63 Third calculation step). In this case, in the (S63 Third calculation step), the lens deformation amount is not treated as the element to be corrected, and the (S63 Third calculation step) may be omitted.

(S5 Step of Acquiring Lens Deformation Information)

Also, in order to acquire the lens deformation information regarding the spectacle lens to be manufactured, the spectacle lens information is transmitted to the lens deformation acquisition part 14 from the client side transmission part 4 of the client side computer 1. Based on the transmitted spectacle lens information, the lens deformation information acquisition part 14 acquires the lens deformation information using a lens expansion rate mainly in accordance with the material of the spectacle lens.

(S63 Third Calculation Step)

Then, the third calculation is performed by the calculation part 8. Namely, correction is performed due to the lens deformation amount caused by the difference between the ordering side temperature and the manufacturing side temperature (environment information).

(S7 Edging Step)

Thereafter, the edging information is transmitted to the edger 6 by the edging information acquisition part 9. Then, the spectacle lens is manufactured by the edger 6 under the manufacturing side environment in accordance with the edging information, so that the spectacle lens is fitted into the frame even under the ordering side environment.

In this embodiment, the following effect is exhibited by the edging information which is the base of manufacturing the spectacle lens at the manufacturing side, in consideration of the difference between the ordering side environment and the manufacturing side environment.

First, the spectacle lens that can be subjected to edging for framing to be framed into the frame with high precision, can be provided wherever the manufacturing side plant is present, and further wherever the ordering party lives. Further such a spectacle lens can be provided, according to a request of an individual client, or according to an individual tracer 5. In other words, this means that a system capable of supplying the spectacle lens of the same quality (size) can be constructed, wherever the manufacturing plant is present. Further, in the area where the ordering party lives, a fitted state of the spectacle lens into the frame with high precision, can be maintained wherever the manufacturing plant is present to manufacture the spectacle lens. Thus, a synergistic effect of the effects obtained from [Embodiments 1 to 4] can be expected.

By the system of this embodiment, it becomes possible to sufficiently prepare for the risk of natural disasters in each country, which is increased with a globalization. Then, diversification of the request of the individual client can be responded, and in addition, such a diversified request can be speedily responded by a relatively simple structure that the environment information is employed, thus making it possible to improve a situation that the framing processing can be performed with high precision only by a determined ordering side and a determined manufacturing side. As a result, the diversified client's needs can be speedily responded, and international competitiveness of the manufacturing side can be improved.

Further, according to the system of this embodiment, even if there are a plurality of client side computers 1 and manufacturing side computers 2, unlike the conventional case, the spectacle lens can be manufactured so as to be framed into the frame satisfactorily in accordance with each computer. Such a merit is extremely great in the present situation in which globalization is progressed.

As described above, according to this embodiment, the system, etc., can be provided for globally and speedily manufacturing the spectacle lens that can be framed into the frame satisfactorily, regardless of the place of the client side or the manufacturing side of the spectacle lens.

Of course the modified example described in [Embodiment 1] can be applied to this embodiment. Also, the modified example described in [Embodiments 2 to 4] can be applied to this embodiment.

Figure 10:
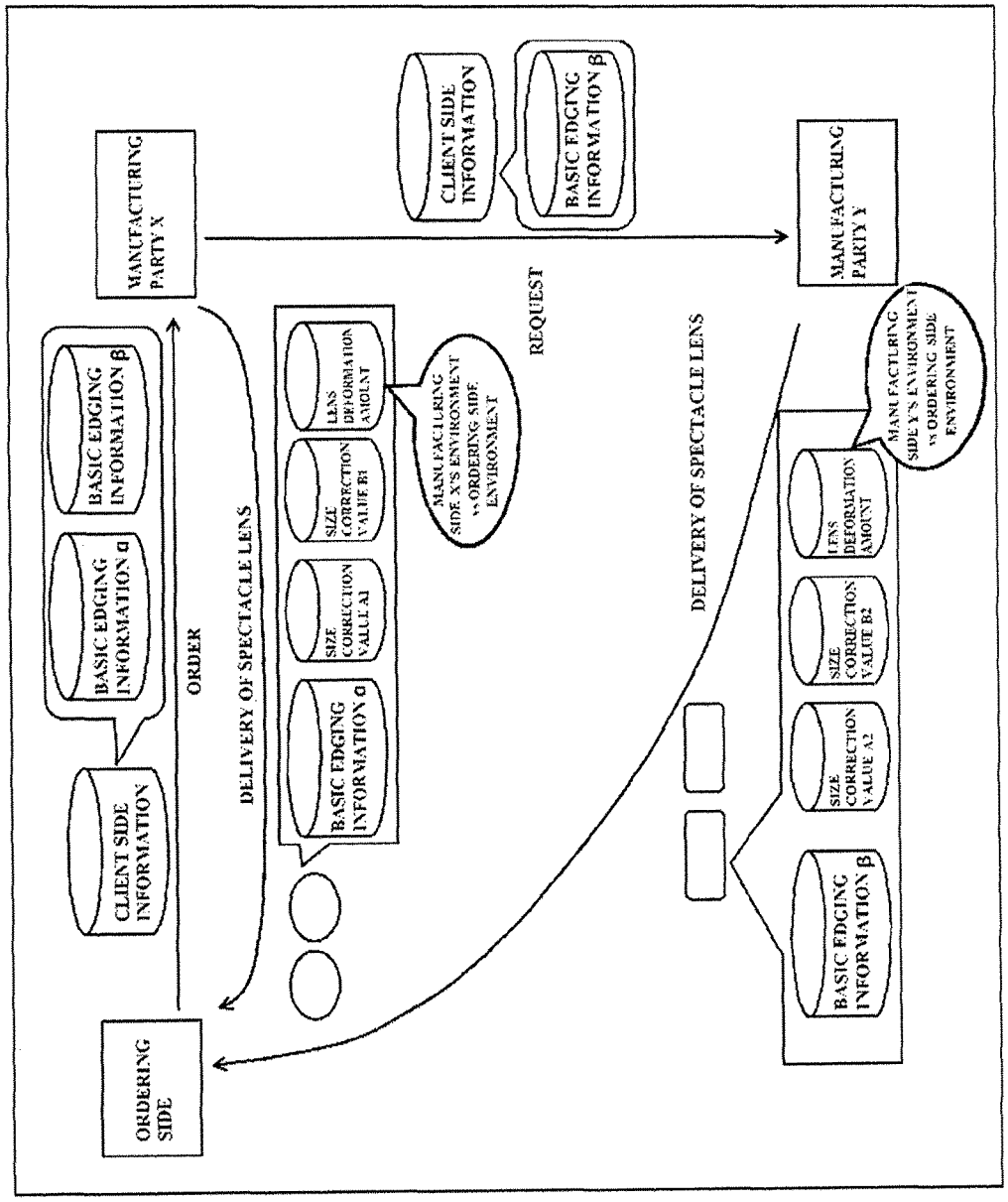
FIG. 10 is a schematic explanatory view regarding a spectacle lens manufacturing system according to another embodiment.

FIG. 10 shows a view following the view of [Embodiment 2]. FIG. 10 is a schematic explanatory view regarding a manufacturing system according to another embodiment.

When the [Embodiment 2] is applied, this is a case when a plurality of manufacturing sides (manufacturing party X and manufacturing party Y) are present at the manufacturing side, and first, the spectacle lens is manufactured in consideration of the lens deformation amount at the manufacturing side X, and regarding the spectacle lens not manufactured by the manufacturing party X, this spectacle lens is manufactured by the manufacturing party Y. During this manufacture, the manufacturing party Y calculates the edging information in consideration of the environment information Y of the manufacturing party Y.

First, the spectacle shop which is the ordering side, calculates basic edging information α and basic edging information β. Then, the basic edging information α and β are transmitted to the manufacturing side computer 2 of the manufacturing party X. Then, the lens deformation amount is calculated from the difference between the manufacturing party X's environment and the ordering side environment and the lens deformation information, and finally the edging information α is calculated, to thereby manufacture the spectacle lens by the edger 6 of the manufacturing party X.

Meanwhile, when manufacture of the spectacle lens not manufactured by the manufacturing party X, is requested for the reason of the shape of the spectacle lens, the manufacturing party X request the manufacturing party Y to manufacture the spectacle lens. At the time of the request, the basic edging information β is transmitted to the manufacturing side computer 2 of the manufacturing party Y from the manufacturing side computer 2 of the manufacturing party X. Then, the manufacturing party Y calculates the lens deformation amount from the difference between the manufacturing side B's environment and the ordering side environment and the lens deformation information so that the edging information β is finally calculated, to thereby manufacture the spectacle lens by the edger 6 of the manufacturing party Y in accordance with this edging information.

Briefly speaking, the manufacturing party X manufactures the spectacle lens in consideration of the difference between its own environment and the ordering side environment, and another manufacturing party Y also manufactures the spectacle lens in consideration of the difference between its own environment and the ordering side environment.

In addition, it is also acceptable that the manufacturing party X makes the manufacturing party Y calculate at least one of the size correction values. For example, although a distance between the ordering side and the manufacturing party X is close to each other, when the manufacturing party Y is present in another country, and when there is a complete difference of the weather between the manufacturing party Y and the ordering side, the manufacturing party X can make the manufacturing party Y calculate the lens deformation amount. Thus, the lens deformation amount at a manufacturing site can be acquired by the manufacturing party Y itself at the manufacturing site. Of course, not the lens deformation amount but the size correction value may be calculated by the manufacturing party Y.

By employing the above-described technique, the manufacturing party X is not required to manufacture all spectacle lenses, thus making it possible to manufacture the spectacle lens that can be framed into the spectacle frame satisfactorily according to the type of the spectacle lens. In addition, even if the manufacturing party is preset in any one of the areas, the spectacle lens that can be framed into the spectacle frame satisfactorily, can be speedily provided. This merit is extremely great for the manufacturing party in the situation of the globalization.

Figure 11:
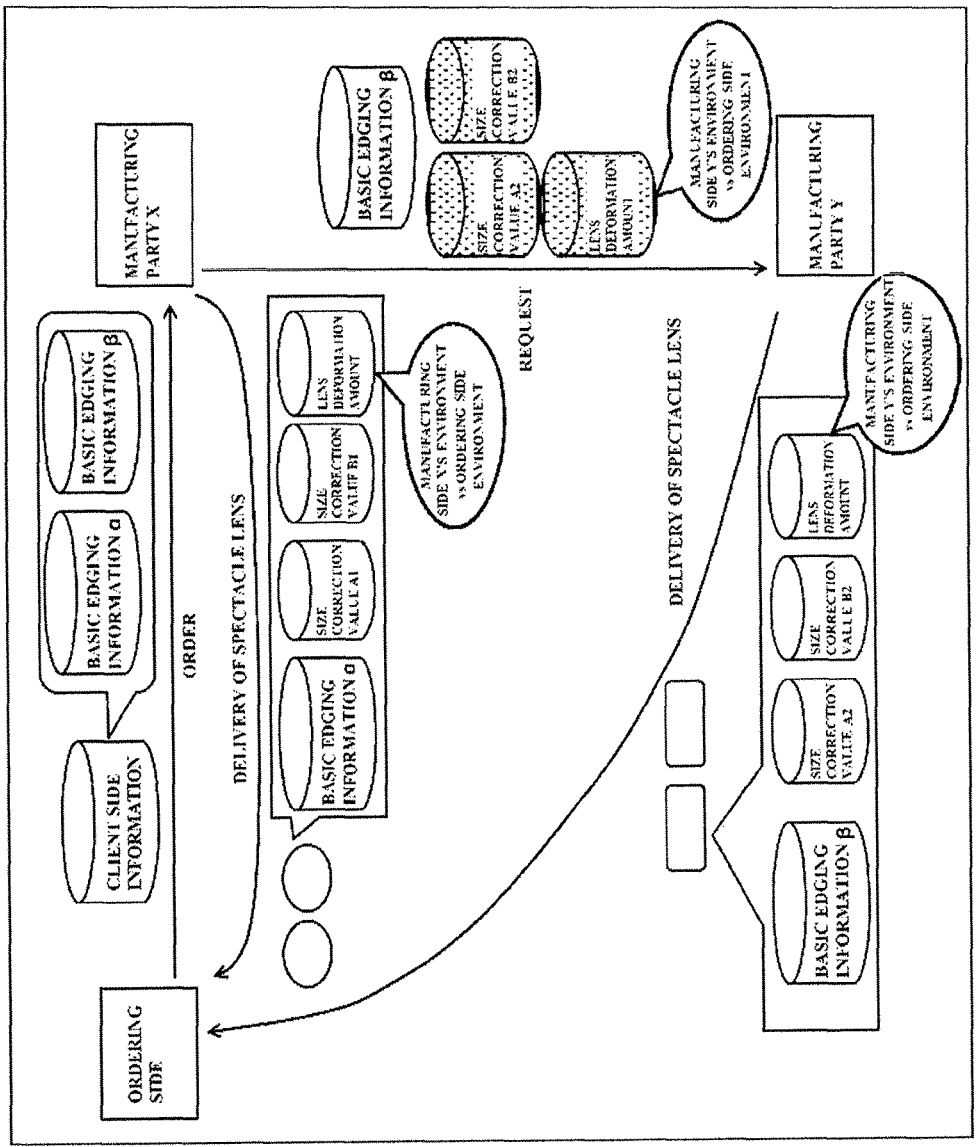
FIG. 11 is a schematic explanatory view regarding a spectacle lens manufacturing system according to another embodiment.

FIG. 11 is a view following the view of [Embodiment 3]. FIG. 11 is a schematic explanatory view regarding the manufacturing system according to another embodiment.

When the [Embodiment 3] is applied, this is a case when a plurality of manufacturing sides (manufacturing party X and manufacturing party Y) are present at the manufacturing side, and first, the spectacle lens is manufactured in consideration of the lens deformation amount at the manufacturing side X, and regarding the spectacle lens not manufactured by the manufacturing party X, this spectacle lens is manufactured by the manufacturing party Y. During this manufacture, the manufacturing party Y calculates the edging information β in consideration of the environment information of the manufacturing party Y, and the manufacturing party Y simply manufactures the spectacle lens in accordance with the edging information β.

First, the spectacle shop which is the ordering side, calculates the basic edging information α and β. Then, the basic edging information α and β are transmitted to the manufacturing side computer 2 of the manufacturing party X. Then, in the manufacturing side computer 2 of the manufacturing party X, the lens deformation amount is calculated from the difference between the manufacturing party X's environment and the ordering side environment and the lens deformation amount, so that the edging information is finally calculated, to thereby manufacture the spectacle lens by the edger 6 of the manufacturing party X, in accordance with the edging information α.

On the other hand, when the manufacture of the spectacle lens not manufactured by the manufacturing party X is requested for the reason of the shape of the spectacle lens, the manufacturing party X requests another manufacturing party Y to manufacture the spectacle lens. In this embodiment, unlike the [Embodiment 2], at the time of the request, the final edging information β is transmitted to the manufacturing side computer 2 of the manufacturing party Y from the manufacturing side computer 2 of the manufacturing party X. Namely, in the manufacturing side computer 2 of the manufacturing party X, the difference between the manufacturing party Y's environment and the ordering side environment is taken into consideration for the basic edging information β. Then, the manufacturing party X transmits the edging information to the manufacturing party Y.

Namely, briefly speaking, the manufacturing party X manufactures the spectacle lens in consideration of the difference between its own environment and the ordering side environment, and meanwhile the manufacturing party X uses another manufacturing party Y as a subcontractor. The edging information β in consideration of the environment of the manufacturing party Y is calculated by the manufacturing party X and transmitted to the manufacturing party Y. Then, the manufacturing party Y manufactures the spectacle lens as the subcontractor of the manufacturing party X. In addition, the manufacturing party Y can manufacture the spectacle lens in consideration of the difference between its own environment and the ordering side environment, although the manufacturing party Y is used as the subcontractor for manufacturing the spectacle lens.

By employing the above-described technique, the similar effect as the effect of [Embodiment 2] can be obtained. In addition, the technique or each kind of information for calculating the edging information, is not required to be disclosed to the manufacturing party Y. When the manufacturing party Y is present abroad, this merit is extremely great for the manufacturing party in the situation of globalization.

Further, this embodiment shows the case that the manufacturing party X calculates the edging information in accordance with the environment of the manufacturing party Y. However, when the difference of the environment is small between the manufacturing party X and the manufacturing party Y, it is acceptable to transmit to the manufacturing party Y the edging information α in consideration of the difference of the environment not between the ordering party and the manufacturing party Y that actually manufactures the spectacle lens, but between the ordering party and the manufacturing party X as the environment information β, to manufacture the spectacle lens with the same high quality as the spectacle lens manufactured by the manufacturing party X.

Figure 12:
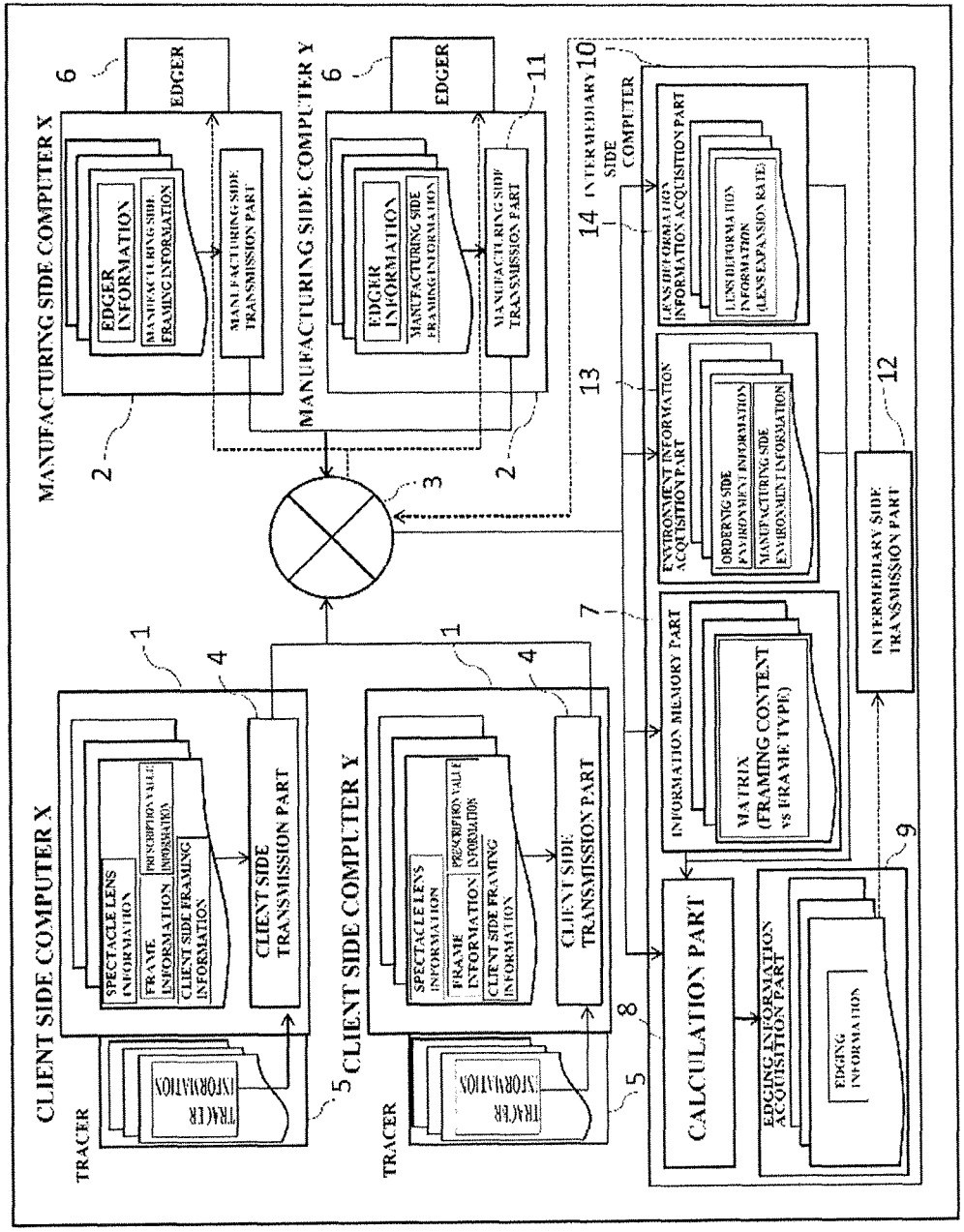
FIG. 12 is a schematic block diagram regarding a manufacturing information management system of a spectacle lens according to another embodiment.

FIG. 12 shows a view following the view of [Embodiment 4]. FIG. 12 is a schematic explanatory view regarding a manufacturing information management system according to another embodiment.

When the [Embodiment 4] is applied, the intermediary side computer is connected to the manufacturing side computer 2 possessed by the manufacturing parties X and Y who actually manufacture the spectacle lens. Then, the manufacturing side information is transmitted to the intermediary side computer 11 from the manufacturing side transmission part 11. This embodiment shows not a case that the edger information is transmitted to the calculation part 8 from the edger 6, but a case that the edger information recorded in the manufacturing side computer 2 is transmitted to the manufacturing side transmission part 11. As a transmission technique of transmitting the edger information, the technique of the above-described embodiment may be used, or the technique of this embodiment may be used.

Further, the intermediary side computer 11 also includes the "environment information acquisition part 13", "lens deformation information acquisition part 14", "calculation part 8", and "edging information acquisition part 9" provided in the manufacturing side computer 2 in the above-described embodiment.

Then, in the "environment information acquisition part 13", "lens deformation information acquisition part 14", and "calculation part 8" of the intermediary side computer 10, the lens deformation amount is calculated from the difference of the environment between each manufacturing party and the ordering side, and from the lens deformation information, so that the edging information is finally calculated. Then, the calculated edging information is acquired by the edging information acquisition part 9. The edging information is transmitted to the manufacturing side computer 2 of each manufacturing party as an external party, by an intermediate side transmission part 12 provided in the intermediate side computer 10. Then, the manufacturing parties X and Y manufacture the spectacle lens by each edger 6, in accordance with the edging information.

As described in the problem of the present invention, globalization of a manufacturing sector has progressed remarkably. With such a globalization, there is also an increased case of not manufacturing the spectacle lens by its own side who engages in a manufacturing industry. Namely, there is also an increased case of providing the edging information of the spectacle lens, to a manufacturing party who actually manufactures the spectacle lens. In such a situation as well, there is still a request to manufacture products speedily, regardless of a change in any situation. Rather, with a development of an information network, importance of managing the edging information described in the above embodiment, has been increased. Under such a circumstance, if edging for framing and framing can be performed with high precision only by the determined ordering side and the determined manufacturing side, diversified client's needs cannot be responded speedily, resulting in a remarkable reduction of international competitiveness of the manufacturing side.

However, by employing the above-described technique, persons who engage in the manufacturing sector can provide the spectacle lens that can be edged for framing and framed into the spectacle frame with high precision, even if they themselves are engaged in a manufacturing sector, or regardless of the place of the manufacturing plant at the manufacturing side, and further regardless of the residence of the ordering party. In this point, a similar effect as embodiment 1 can be obtained.

Further, according to the system of this embodiment, even when there are a plurality of client side computers 1 and manufacturing side computers 2, the spectacle lens that can be framed into the spectacle frame satisfactorily in accordance with each computer, can be manufactured, unlike a conventional case. This merit is extremely great for the manufacturing party in the situation of globalization.

Embodiment 6

As described in the above-described embodiment, this embodiment shows an example of not only transferring to the manufacturing side, a client side preference which is the framing content, but also positively giving an instruction to the manufacturing side regarding the edging size reflecting the client side preference, and giving an instruction thereto regarding the outer diameter shape of the spectacle lens.

As described in the problem of the invention, the request of the individual client has been steadily diversified. By using the technique of the above-described embodiment, the spectacle lens that can be framed satisfactorily can be globally and speedily provided, even in the case that whichever sides of the client side and the manufacturing side performs the framing process.

On the other hand, if a certain client (client side) must change frequent requests such as a change of the size correction value B, the size correction value B which is the base of calculating the edging information, must be changed every time the client's request is changed. Therefore, maintenance of the matrix B of the size correction value B must be always performed by the manufacturing side.

Further, since the size correction value B is obtained by the manufacturing side, and the client side calculates the whole size correction value therefrom. Therefore, there is a frustration of not immediately reflecting a request content on the edging. In addition, when it is not easy to contact the manufacturing side by the client side like a case that the client side or the manufacturing side is present in a foreign country, such a frustration is increased.

Further, when the client side has a request regarding the preference of the content (framing content) that is not present in the matrix B of the size correction value B, the manufacturing side must prepare the matrix B according to such a new preference.

Therefore, in order to solve the problem of this embodiment, while exhibiting the effect of the present invention, there is provided a manufacturing system of a spectacle lens, including:

a client side computer 1 installed at a client side; and a calculation part 8 configured to calculate the edging information, wherein the size correction value includes at least a numerical value (size correction value B here) in a matrix when a relationship between a fastening degree of a spectacle lens into a frame during framing and a frame type, is converted to the matrix, and the client side computer causes a client side to give an instruction of an edging size of a spectacle lens to a manufacturing side, based on the size correction value B in accordance with a fastening degree of the spectacle lens into the frame during the framing and the frame type.

Conventionally, the client side simply transfers the preference of the client regarding the framing process, to the manufacturing side. Meanwhile, in this embodiment, the client side gives an instruction to the manufacturing side regarding not a vague one such as a preference but a specific numerical value of the edging size.

Here, as a specific example of the matter that "the client side computer gives an instruction of the edging size of the spectacle lens to the manufacturing side from the client side, based on the size correction value B", this embodiment shows an example that the client side computer 1 supposed to be present at the spectacle shop, can directly change the size correction value B selected from the matrix B in the information memory part 7. Further, as another example, this embodiment shows an example that not the manufacturing side computer 2 but the client side computer 1 acquires the size correction value B from the information memory part 7, and transmits the size correction value B to the calculation part 8.

The description hereafter shows a case that the calculation part 8 is installed ate the manufacturing side computer 2. Of course, the calculation part 8 may be provided in another computer or a server, other than the manufacturing side computer 2.

In the abovementioned embodiment, it is possible to access the information memory part 7 from the client side computer 1. Then, at least the matrix B is set so as to be acquired by the client side computer 1. In other words, the matrix B and the size correction value B are open to the client side. Namely, according to the abovementioned structure, the size correction value B and the matrix B can be changed by the client side computer. The "change" called here, includes update of the numerical value, addition of the size correction value B associated with addition of a new relationship in the matrix B, and cancel of the size correction value B associated with cancel of the relationship in the matrix B. In this case as well, after all, there is no difference from selecting the size correction value B (after correction) from the matrix B (after correction) by the client side computer 1. In this case, the client side computer 1 simply changes the size correction value B. In other words, it is the information memory part 7 or the manufacturing side transmission part 11, that transmits the size correction value B to the calculation part 8, and the client side computer 1 is not required to transmit the size correction value B to the calculation part 8.

An example of the technique of changing the size correction value B is as follows.

In FIG. 3, when the client side (spectacle shop) is 03, the frame type is a full rim type, the material of the frame is 02, and when the client side performs framing and performs heating the frame, the size correction value B is 0.10 mm. However, when the spectacle shop is requested not to perform heating the frame, the client side computer 1 in the spectacle shop changes the size correction value B to 0.00 mm, the size correction value B being in the information memory part 7 that is present in the manufacturing side computer 2. Contrary thereto, when the spectacle shop is requested to perform further higher heating the frame, the client side computer 1 in the spectacle shop changes the size correction value B in the information memory part 7 that is present in the manufacturing side computer 2, so as to be somewhat larger at a unit of 0.01 mm.

The client side computer 1 may also be configured to select the size correction value B from the matrix B. In this case, by transmitting the size correction value B which is the base of the edging information to the manufacturing side computer 2 by the client side computer 1, the client side can directly give an instruction to the manufacturing side regarding the edging size of the spectacle lens.

Even if the size correction value B is changed by the client side, to an unsuitable value in the framing step, for example, the abovementioned manufacturing side necessity/non-necessity judgment part may judge whether or not the size correction value B is suitable. If it is judged to be unsuitable, a new correction value may be added to the size correction value so that the framing can be performed.

By employing the abovementioned structure, the preference of the client side (namely, fastening degree of the spectacle lens into the frame during framing) can be directly transmitted to the manufacturing side computer 2 from the client side computer 1. Namely, the preference of the client side can be reflected on the edging information by the client sides themselves.

As a result, even if frequent requests are given by the client sides to change the size correction value B, the client sides themselves select or prepare the size correction value B, thus remarkably reducing the manufacturing side load represented by the management of the matrix B.

Further, even if the client side or the manufacturing side is present in a foreign country, it is possible for the client side to immediately reflect the request content on the edging, and a satisfaction is obtained in a point that the client side can directly treat the edging size.

Then, even if the client side has a request regarding the preference of the content (framing content) which is not present in the matrix B of the size correction value B, it is also possible for the client sides themselves to prepare the matrix B according to the new preference. Of course, when it is technically difficult for the client sides themselves to prepare the matrix B, the manufacturing side may prepare a part of the matrix B.

This embodiment shows an example of giving an instruction to the manufacturing side by the client side, regarding the edging size of the spectacle lens. On the other hand, in accordance with a direct instruction of the specific value of the edging size, or instead of a direction instruction of the specific value of the edging size, the client side may give the instruction to the manufacturing side regarding the framing content in a state of making the manufacturing side perform the framing step. Thus, whoever the manufacturing side is, a framing state requested by the client side is always realized. Briefly speaking, the instruction is given to the manufacturing side regarding execution of the framing content preferred by the client side, and the manufacturing side is made to manufacture the edging size reflecting the preference of the client side, and perform framing. So to speak, this is equal to the matter that the manufacturing side completely performs the framing work on behalf of the client side. In this case, for example, when the client side gives an instruction to the manufacturing side regarding the framing content (heating the frame), a technique of updating the matrix by operating the client side computer 1 by the client side, may be employed so that the manufacturing side selects only "heating the frame", out of the item of the "whether or not the frame is heated" in the "framing content" in the matrix. Further, it is also possible to reverse the position of the manufacturing side and the position of the client side. Namely, in the state of performing the framing step by the client side, the manufacturing side may give the instruction to the client side regarding the framing content. Then, the manufacturing side may update the matrix so that the client side can select only the "heating the frame" out of the item of the "whether or not the frame is heated" in the "framing content" in the matrix.

This embodiment also shows an aspect of not only the spectacle lens manufacturing system, but also an aspect of a spectacle lens an ordering system. A specific structure is as follows.

There is provided a spectacle lens ordering system, including:

a client side computer 1 installed at a client side;

a calculation part 8 configured to calculate the edging information; and an information memory part 7 configured to store a matrix which is prepared by converting to a matrix a relationship between a fastening degree of a spectacle lens into a frame during framing, and a frame type, and in which there is a size correction value for a scheduled edging shape of a lens to be edged, as a numerical value in the matrix, wherein a client side computer 1 gives an instruction to a manufacturing side regarding an edging size of a spectacle lens, based on a size correction value B in accordance with a fastening degree of the spectacle lens into the frame during framing and the frame type.

Even the abovementioned ordering system can solve the problem described in this embodiment. Namely, the client side preference can be reflected on the edging information by the client sides themselves, so that the abovementioned effect can be exhibited. It is a matter of course that the content of this embodiment is suitably applied to the content of the abovementioned embodiment.

DESCRIPTION OF SIGNS AND NUMERALS

1 Client side computer
2 Manufacturing side computer
3 Communication line
4 Client side transmission part
5 Tracer
6 Edger
7 Information memory part
8 Calculation part
9 Edging information acquisition part
10 Intermediary side computer
11 Manufacturing side transmission part
12 Intermediary side transmission part
13 Environment information acquisition part
14 Lens deformation information acquisition part

The invention claimed is:

1. A spectacle lens manufacturing system in which a relationship between a type of a spectacle frame, framing content and framing performed at either (i) one of a plurality of client sides that request a manufacture of a spectacle lens or (ii) a manufacturing side of the spectacle lens is converted to a matrix, the matrix comprising a size correction value corresponding to each framing content, each frame type, and the client or manufacturing side that performs the framing, and the framing content being a framing process describing actions performed during framing, the system comprising:

an information memory part configured to store the matrix including the size correction value for a scheduled edging shape of a lens to be edged as a numerical value in the matrix;

an edging information acquisition part configured to acquire edging information calculated based on (i) client side information for manufacturing a spectacle lens, including spectacle lens information, prescription value information, frame information that includes information regarding a frame type, and tracer information that includes information regarding a tracer type used for measuring a framed shape, (ii) spectacle lens manufacturing side information that includes edger information, and (iii) the size correction value selected from the matrix corresponding to the framing content, each frame type, and the client or manufacturing side that performs the framing, which is the size correction value for the scheduled edging shape of the lens to be edged, as numerical values in the matrix; and an edger configured to edge the lens to be edged based on the edging information acquired by the edging information acquisition part in order to fit the lens into the frame and form the spectacle lens regardless of whether the client side or the manufacturing side performs the framing.

2. The system of claim 1, wherein the framing content is obtained from (i) client side framing information included in the client side information and (ii) manufacturing side framing information included in the manufacturing side information, and the framing content includes at least one of (i) a necessity for heating a frame and a degree of heating the frame, and (ii) a fastening degree of the spectacle lens into the frame during framing.

3. The system of claim 2, wherein the spectacle lens is formed by the edger, under a manufacturing side environment, in accordance with a lens deformation amount between a case when the spectacle lens is present in an ordering side environment and when the spectacle lens is present in a manufacturing side environment, calculated based on environment information that includes ordering side environment information and manufacturing side environment information of the spectacle lens and lens deformation information regarding a deformation of a lens according to the environments, and edging information calculated based on the size correction value A and the size correction value B, so that the spectacle lens is fitted into the frame even under an ordering side environment, and the ordering side of the spectacle lens is a purchaser of the spectacle lens, and the client side for manufacturing a spectacle lens is the ordering side of the spectacle lens, which is a prime contractor when the prime contractor that receives an order of the spectacle lens requests a subcontractor to manufacture the spectacle lens, or refers to the subcontractor when the subcontractor requests another subcontractor to manufacture the spectacle lens.

4. The system of claim 3, comprising:

a client side computer installed at a client side of the plurality of client sides;

a manufacturing side computer installed at the manufacturing side; and a calculation part configured to calculate the edging information, wherein the client side computer comprises:

a client side transmission part configured to transmit the client side information to the calculation part, the client side information including information regarding whether framing is performed at the client side, and when the framing is performed, information regarding whether heating is performed to the frame, and information regarding a heating degree, the manufacturing side computer comprises:
a manufacturing side transmission part configured to transmit to the calculation part the manufacturing side information including manufacturing side framing information that includes information regarding (i) whether framing is performed at a manufacturing side, (ii) when the framing is performed, information regarding whether heating is performed to the frame during the framing, and (iii) information regarding a degree of the heating,
the edging information is calculated by the calculation part based on the client side information, the manufacturing side information, and the size correction value obtained from the information memory part in accordance with the client side information and the manufacturing side information, and
the calculated edging information is transmitted to the edging information acquisition part.

5. The system of claim 2, comprising:
a client side computer installed at a client side of the plurality of client sides;
a manufacturing side computer installed at the manufacturing side; and
a calculation part configured to calculate the edging information,
wherein the client side computer comprises:
a client side transmission part configured to transmit the client side information to the calculation part, the client side information including information regarding whether framing is performed at the client side, and when the framing is performed, information regarding whether heating is performed to the frame, and information regarding a heating degree,
the manufacturing side computer comprises:
a manufacturing side transmission part configured to transmit to the calculation part the manufacturing side information including manufacturing side framing information that includes information regarding (i) whether framing is performed at a manufacturing side, (ii) when the framing is performed, information regarding whether heating is performed to the frame during the framing, and (iii) information regarding a degree of the heating,
the edging information is calculated by the calculation part based on the client side information, the manufacturing side information, and the size correction value obtained from the information memory part in accordance with the client side information and the manufacturing side information, and
the calculated edging information is transmitted to the edging information acquisition part.

6. The system of claim 2, wherein the size correction value includes a size correction value A and a size correction value B,
the size correction value A is a numerical value in the matrix when at least a relationship between the tracer type and the frame type is converted to matrix A, and
the size correction value B is a numerical value in the matrix when a relationship between the client or manufacturing side that performs the framing step, the necessity for heating a frame, a degree of heating the frame, and the frame type, is converted to matrix B.

7. The system of claim 6, wherein the spectacle lens is formed by the edger, under a manufacturing side environment, in accordance with a lens deformation amount between a case when the spectacle lens is present in an ordering side environment and when the spectacle lens is present in a manufacturing side environment, calculated based on environment information that includes ordering side environment information and manufacturing side environment information of the spectacle lens and lens deformation information regarding a deformation of a lens according to the environments, and edging information calculated based on the size correction value A and the size correction value B, so that the spectacle lens is fitted into the frame even under an ordering side environment, and
the ordering side of the spectacle lens is a purchaser of the spectacle lens, and the client side for manufacturing a spectacle lens is the ordering side of the spectacle lens, which is a prime contractor when the prime contractor that receives an order of the spectacle lens requests a subcontractor to manufacture the spectacle lens, or refers to the subcontractor when the subcontractor requests another subcontractor to manufacture the spectacle lens.

8. The system of claim 7, comprising:
a client side computer installed at a client side of the plurality of client sides;
a manufacturing side computer installed at the manufacturing side; and
a calculation part configured to calculate the edging information,
wherein the client side computer comprises:
a client side transmission part configured to transmit the client side information to the calculation part, the client side information including information regarding whether framing is performed at the client side, and when the framing is performed, information regarding whether heating is performed to the frame, and information regarding a heating degree,
the manufacturing side computer comprises:
a manufacturing side transmission part configured to transmit to the calculation part the manufacturing side information including manufacturing side framing information that includes information regarding (i) whether framing is performed at a manufacturing side, (ii) when the framing is performed, information regarding whether heating is performed to the frame during the framing, and (iii) information regarding a degree of the heating,
the edging information is calculated by the calculation part based on the client side information, the manufacturing side information, and the size correction value obtained from the information memory part in accordance with the client side information and the manufacturing side information, and
the calculated edging information is transmitted to the edging information acquisition part.

9. The system of claim 6, comprising:
a client side computer installed at a client side of the plurality of client sides;
a manufacturing side computer installed at the manufacturing side; and
a calculation part configured to calculate the edging information,
wherein the client side computer comprises:
a client side transmission part configured to transmit the client side information to the calculation part, the client side information including information regarding whether framing is performed at the client side, and when the framing is performed, information regarding whether heating is performed to the frame, and information regarding a heating degree, the manufacturing side computer comprises:
a manufacturing side transmission part configured to transmit to the calculation part the manufacturing side information including manufacturing side framing information that includes information regarding (i) whether framing is performed at a manufacturing side, (ii) when the framing is performed, information regarding whether heating is performed to the frame during the framing, and (iii) information regarding a degree of the heating,
the edging information is calculated by the calculation part based on the client side information, the manufacturing side information, and the size correction value obtained from the information memory part in accordance with the client side information and the manufacturing side information, and
the calculated edging information is transmitted to the edging information acquisition part.

10. The system of claim 1, wherein the spectacle lens is formed by the edger, under a manufacturing side environment, in accordance with a lens deformation amount between a case when the spectacle lens is present in an ordering side environment and when the spectacle lens is present in a manufacturing side environment, calculated based on environment information that includes ordering side environment information and manufacturing side environment information of the spectacle lens and lens deformation information regarding a deformation of a lens according to the environments, and edging information calculated based on the size correction value A and the size correction value B, so that the spectacle lens is fitted into the frame even under an ordering side environment, and
the ordering side of the spectacle lens is a purchaser of the spectacle lens, and the client side for manufacturing a spectacle lens is the ordering side of the spectacle lens, which is a prime contractor when the prime contractor that receives an order of the spectacle lens requests a subcontractor to manufacture the spectacle lens, or refers to the subcontractor when the subcontractor requests another subcontractor to manufacture the spectacle lens.

11. The system of claim 10, comprising:
a client side computer installed at a client side of the plurality of client sides;
a manufacturing side computer installed at the manufacturing side; and
a calculation part configured to calculate the edging information,
wherein the client side computer comprises:
a client side transmission part configured to transmit the client side information to the calculation part, the client side information including information regarding whether framing is performed at the client side, and when the framing is performed, information regarding whether heating is performed to the frame, and information regarding a heating degree,
the manufacturing side computer comprises:
a manufacturing side transmission part configured to transmit to the calculation part the manufacturing side information including manufacturing side framing information that includes information regarding (i) whether framing is performed at a manufacturing side, (ii) when the framing is performed, information regarding whether heating is performed to the frame during the framing, and (iii) information regarding a degree of the heating,
the edging information is calculated by the calculation part based on the client side information, the manufacturing side information, and the size correction value obtained from the information memory part in accordance with the client side information and the manufacturing side information, and
the calculated edging information is transmitted to the edging information acquisition part.

12. The system of claim 1, comprising:
a client side computer installed at a client side of the plurality of client sides;
a manufacturing side computer installed at the manufacturing side; and
a calculation part configured to calculate the edging information,
wherein the client side computer comprises:
a client side transmission part configured to transmit the client side information to the calculation part, the client side information including information regarding whether framing is performed at the client side, and when the framing is performed, information regarding whether heating is performed to the frame, and information regarding a heating degree,
the manufacturing side computer comprises:
a manufacturing side transmission part configured to transmit to the calculation part the manufacturing side information including manufacturing side framing information that includes information regarding (i) whether framing is performed at the manufacturing side, (ii) when the framing is performed, information regarding whether heating is performed to the frame during the framing, and (iii) information regarding a degree of the heating,
the edging information is calculated by the calculation part based on the client side information, the manufacturing side information, and the size correction value obtained from the information memory part in accordance with the client side information and the manufacturing side information, and
the calculated edging information is transmitted to the edging information acquisition part.

13. The system of claim 1, further comprising:
a client side computer installed at a client side of the plurality of client sides; and
a calculation part configured to calculate the edging information,
wherein the size correction value includes the numerical value in the matrix when a relationship between a fastening degree of a spectacle lens into a frame during framing and a frame type is converted to the matrix, and
the client side computer causes the client side to give an instruction of an edging size of the spectacle lens to the manufacturing side, based on the numerical value corresponding to the frame type and the fastening degree of the spectacle lens into the frame during the framing.

14. A spectacle lens manufacturing device in which a relationship between a frame type, a framing content and framing performed at either (i) one of a plurality of client sides that request a manufacture of a spectacle lens or (ii) a manufacturing side of the spectacle lens is converted to a matrix, the matrix comprising a size correction value corresponding to each framing content, each frame type, and the client or manufacturing side that performs the framing, and the framing content being a framing process describing actions performed during framing, the device comprising:
- an edging information acquisition part configured to acquire edging information calculated based on (i) client side information for manufacturing a spectacle lens, including spectacle lens information, prescription value information, frame information that includes information regarding a frame type, and tracer information that includes information regarding a tracer type used for measuring a framed shape, (ii) spectacle lens manufacturing side information such as edger information, and (iii) the size correction value selected from the matrix corresponding to the framing content, each frame type, and the client or manufacturing side that performs the framing, which is the size correction value for a scheduled edging shape of a lens to be edged, as numerical values in the matrix; and
- an edger configured to edge the lens to be edged based on the edging information acquired by the edging information acquisition part in order to fit the lens into the frame and form the spectacle lens regardless of whether the client side or the manufacturing side performs the framing.

15. A spectacle lens manufacturing method for manufacturing a spectacle lens fitted into a frame even if framing is performed at either one of a request side and a manufacturing side, the method comprising:

- converting to a matrix a relationship between a frame type, a framing content and framing performed at either (i) one of a plurality of client sides that request a manufacture of a spectacle lens or (ii) a manufacturing side of the spectacle lens, the matrix comprising a size correction value corresponding to each framing content, each frame type, and the client or manufacturing side that performs the framing, and the framing content being a framing process describing actions performed during framing; and
- edging a lens to be edged in accordance with edging information calculated based on (i) client side information for manufacturing a spectacle lens, including spectacle lens information, prescription value information, frame information that includes information regarding a frame type, and tracer information that includes information regarding a tracer type used for measuring a framed shape, (ii) spectacle lens manufacturing side information that includes edger information, and (iii) the size correction value as a numerical value in the matrix for a scheduled edging shape of the lens to be edged,
- wherein the lens is fit into the frame to form the spectacle lens regardless of whether the client side or the manufacturing side performs the framing.

* * * * *